(12) United States Patent
Stowell et al.

(10) Patent No.: US 11,773,014 B2
(45) Date of Patent: Oct. 3, 2023

(54) TOUGHENED CARBON-CONTAINING GLASS MATERIALS

(71) Applicant: Lyten, Inc., San Jose, CA (US)

(72) Inventors: Michael W. Stowell, Sunnyvale, CA (US); Bruce Lanning, Littleton, CO (US)

(73) Assignee: Lyten, Inc., San Jose, CA (US)

(*) Notice: Subject to any disclaimer, the term of this patent is extended or adjusted under 35 U.S.C. 154(b) by 367 days.

(21) Appl. No.: 17/138,690

(22) Filed: Dec. 30, 2020

(65) Prior Publication Data

US 2022/0041491 A1     Feb. 10, 2022

Related U.S. Application Data

(60) Provisional application No. 63/061,066, filed on Aug. 4, 2020.

(51) Int. Cl.
    *C03C 23/00*        (2006.01)
    *C03C 3/083*        (2006.01)
    (Continued)

(52) U.S. Cl.
    CPC ........ *C03C 23/0055* (2013.01); *C01B 32/194* (2017.08); *C03C 3/04* (2013.01);
    (Continued)

(58) Field of Classification Search
    CPC ............. C23C 23/0055; C23C 23/006; C23C 23/0065; C23C 21/007; C23C 3/04;
    (Continued)

(56) References Cited

U.S. PATENT DOCUMENTS 4,701,317 A    10/1987   Arakawa et al.
6,337,110 B1    1/2002    Delaunay et al.
(Continued)

FOREIGN PATENT DOCUMENTS

EP           1281680 A2    2/2003
WO    2015/189643 A1    12/2015
(Continued)

OTHER PUBLICATIONS

Allaire, A. et al., "Fracture Behavior and Intrinsic Strength of FPD Substrates", Technical Information Paper 203; Corning Incorporated, Corning, NY; Nov. 2004; 5 pages. (Paper presented at SID 1996, San Diego, CA).

(Continued)

*Primary Examiner* — Tri V Nguyen
(74) *Attorney, Agent, or Firm* — Paradice & Li LLP

(57) ABSTRACT

In some implementations, a carbon-containing glass material includes a surface-to-air interface and an interphase region extending from the surface-to-air interface along a direction to a depth within the carbon-containing glass material. The surface-to-air interface may be exposed to ambient air, and the interphase region may include a plurality of few layer graphene (FLG) nanoplatelets formed in response to recombination and/or self-nucleation of a plurality of carbon-containing radicals implanted within the interphase region. The FLG nanoplatelets have a non-periodic orientation configured to at least partially inhibit formation or propagation of microcracks and/or micro-voids in the carbon-containing glass material. The glass material may also include a compressive stress layer disposed between the interphase region and the surface-to-air interface of the carbon-containing glass material, the compressive stress layer induced by ion bombardment of the carbon-containing glass material by a plurality of ionized inert gas particles.

20 Claims, 11 Drawing Sheets

(51) Int. Cl.
- *C03C 14/00* (2006.01)
- *C03C 21/00* (2006.01)
- *C03C 3/04* (2006.01)
- *C03C 17/00* (2006.01)
- *C01B 32/194* (2017.01)
- *C01B 32/198* (2017.01)

(52) U.S. Cl.
CPC ............ *C03C 3/083* (2013.01); *C03C 14/004* (2013.01); *C03C 17/007* (2013.01); *C03C 21/007* (2013.01); *C03C 23/006* (2013.01); *C03C 23/0065* (2013.01); *C01B 32/198* (2017.08); *C03C 2217/47* (2013.01)

(58) Field of Classification Search
CPC ................ C23C 3/083; C23C 2217/47; C23C 2217/452; C23C 14/004; C23C 17/007; C23C 17/008; C01B 32/194; C01B 32/198
USPC .......................................................... 428/408
See application file for complete search history.

(56) References Cited

U.S. PATENT DOCUMENTS

| | | | |
|---|---|---|---|
| 6,582,778 | B2 | 6/2003 | Namiki et al. |
| 6,805,779 | B2 | 10/2004 | Chistyakov |
| 7,623,340 | B1 | 11/2009 | Song et al. |
| 7,790,243 | B2 | 9/2010 | Radhakrishnan et al. |
| 9,005,809 | B2 | 4/2015 | Wilkening et al. |
| 9,419,274 | B2 | 8/2016 | Wilkening et al. |
| 9,576,694 | B2 | 2/2017 | Gogotsi et al. |
| 9,721,734 | B2 | 8/2017 | Ryu et al. |
| 10,117,806 | B2 | 11/2018 | Chang et al. |
| 10,160,688 | B2 | 12/2018 | Amin et al. |
| 10,472,497 | B2 | 11/2019 | Stowell et al. |
| 10,907,031 | B2 | 2/2021 | Stowell et al. |
| 2008/0248275 | A1* | 10/2008 | Jang ................ C01B 32/225 252/502 |
| 2014/0106141 | A1 | 4/2014 | Bellman et al. |
| 2014/0106150 | A1 | 4/2014 | Decker et al. |
| 2014/0224466 | A1* | 8/2014 | Lin .................. H01L 23/3737 165/185 |
| 2015/0099078 | A1 | 4/2015 | Fish |
| 2016/0052821 | A1* | 2/2016 | Busardo ................ C23C 14/48 65/30.13 |
| 2016/0207291 | A1 | 7/2016 | Dimitrakopoulos et al. |
| 2018/0058782 | A1 | 3/2018 | Zhamu et al. |
| 2018/0327611 | A1 | 11/2018 | Scheffer |
| 2020/0262745 | A1* | 8/2020 | Li ........................ C03C 17/22 |
| 2021/0057751 | A1 | 2/2021 | Lanning et al. |
| 2021/0226195 | A1 | 7/2021 | Stowell et al. |

FOREIGN PATENT DOCUMENTS

| | | |
|---|---|---|
| WO | 2019/126196 A1 | 6/2019 |
| WO | 2019/168967 A1 | 9/2019 |
| WO | 2021/080664 A1 | 4/2021 |
| WO | 2021/158395 A1 | 8/2021 |

OTHER PUBLICATIONS

Critchley, L., "What are the Optical Properties of Graphene?", Mar. 19, 2019 (printed from https://www.azooptics.com/Article.aspx?ArticleID=1537); 4 pages.

International Search Report and Written Opinion dated Apr. 11, 2019 for PCT Appl. No. PCT/US2018/066271; 12 pages.

International Search Report and Written Opinion dated Jun. 12, 2019 for PCT Appl. No. PCT/US2019/019812; 9 pages.

International Search Report and Written Opinion dated Aug. 7, 2019, for PCT Patent Application Serial No. PCT/US2019/029445; 10 pages.

International Search Report and Written Opinion dated Apr. 28, 2021 for PCT Appl. No. PCT/US2021/015098; 9 pages.

Moriche, R. et al., "Graphene nanoplatelets coated glass fibre fabrics as strain sensors", Composites Science and Technology, vol. 146; Apr. 15, 2017; pp. 59-64.

Ovid'ko, I. et al., "Toughening due to crack deflection in ceramic- and metal-graphene nanocomponents", Rev. Adv. Mater. Sci., vol. 43; Sep. 15, 2015; pp. 52-60.

Sun, J. et al., "Graphene Glass from Direct CVD Routes: Production and Applications", Materials Views; vol. 28; (2016); pp. 10333-10339.

Wang, F. et al., "Size effect of graphene nanoplatelets on the morphology and mechanical behavior of glass fiber/epoxy composites", J. Mater. Sci., vol. 51; (2016) published online Dec. 17, 2015; pp. 3337-3348.

"Why Does Glass Break?" Part 2—Behind the Glass; Corning Museum of Glass; Corning, Inc., Corning, NY; Jun. 3, 2015 (printed from https://blog.cmog.org/2015/06/03/part-2-why-does-glass-break/ on Dec. 14, 2020); 8 pages.

Xie, Z. et al., "Layer thickness effects on the strengthening and toughening mechanisms in metallic glass-graphene nanolaminates", Computational Materials Science, vol. 177, No. 109536; Feb. 4, 2020; 8 pages.

Yang, B. et al., "Temperature effect on graphene-filled interface between glass-carbon hybrid fibers and epoxy resin characterized by fiber-bundle pull-out test", J. Appl. Polym. Sci., No. 46263; Jan. 2018; 11 pages.

Zaheer, U. et al., "A treatise on multiscale glass fiber epoxy matrix composites containing graphene nanoplatelets", Advanced Composites and Hybrid Materials; vol. 1; Aug. 29, 2018; pp. 705-721.

Zhang, B. et al., "Mechanical and Thermal Properties of Hierarchical Composites Enhanced by Pristine Graphene and Graphene Oxide Nanoinclusions", J. Appl. Polym. Sci., No. 40826; Apr. 2014; 9 pages.

\* cited by examiner

TOUGHENED CARBON-CONTAINING GLASS MATERIALS

CROSS-REFERENCE TO RELATED APPLICATIONS

This Patent Application claims priority to U.S. Provisional Patent Application No. 63/061,066 entitled "GRAPHENE IN ALKALI ALUMINOSILICATE GLASS" filed on Aug. 4, 2020, which is assigned to the assignee hereof. The disclosures of all prior Applications are considered part of and are incorporated by reference in this Patent Application.

TECHNICAL FIELD

This disclosure relates generally to glass materials, and specifically, to manufacturing, strengthening, and/or reinforcing glass materials with few layer graphene (FLG) nanoplatelets dispersed throughout one or more portions of the glass materials.

BACKGROUND

Glass is a non-crystalline solid material that can be used in diverse areas including, for example, windows, digital screen displays, optical instruments, and pharmaceutical storage containers. Glass may include silicon dioxide ($SiO_2$), also referred to as silica, as a primary constituent material. Generally, glass may be formed by heating a mixture of dry granular silicon dioxide with other raw solid materials until the mixture reaches a soften semi-solid state, and then rapidly cooling the mixture to prevent the mixture from forming a crystalline structure. Glass is relatively fragile compared to other solid materials, and may scratch, crack, and/or shatter more easily than other solid materials. As such, there is a need for glass and glass materials that are stronger, less fragile, and less susceptible to cracking than conventional glass and glass materials.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method of manufacture. In various implementations, the method may be used to manufacture, strengthen, and/or reinforce carbon-containing glass materials. In some implementations, the method may include flowing a hydrocarbon gas and silane into a reactor. The method may include providing an additive including any one or more of lithium, nickel, manganese, copper, tri-methyl aluminum (TMA), tri-methyl gallium (TMG) or sulfur to the reactor. The method may include generating a non-thermal equilibrium plasma based on excitement of the hydrocarbon gas and the silane by a microwave energy, where the non-thermal equilibrium plasma includes a plurality of methyl radicals. The method may include ion-bombarding a surface-to-air interface of the carbon-containing glass material with at least the methyl radicals, the ion-bombardment configured to create an interphase region within the carbon-containing glass material. The method may include forming a plurality of few layer graphene (FLG) nanoplatelets within the interphase region of the carbon-containing glass material at varying concentration levels based on recombination or self-nucleation of the plurality of methyl radicals. The plurality of FLG nanoplatelets may be dispersed throughout the interphase region in a non-periodic orientation that can at least partially inhibit formation or propagation of cracks and/or surface defects in the carbon-containing glass material. The method may include doping one or more surfaces of at least some of the FLG nanoplatelets formed in the interphase region with the additive. The method may include intercalating the additive between adjacent graphene layers within at least some of the FLG nanoplatelets formed within the interphase region of the carbon-containing glass material.

In various implementations, the carbon-containing glass material may include any one or more of a silicate glass, soda-lime glass, alkali-aluminosilicate glass, or a borosilicate glass. In some implementations, the alkali-aluminosilicate glass consists of between approximately 57% to 60% $SiO_2$, between approximately 10% to 25% $Al_2O_3$, and approximately 10% alkali earth metals. The silane may be a silane-bearing liquid precursor or a silane gas. In one implementation, the FLG nanoplatelets formed in the interphase region have a combined weight of less than 2% of the carbon-containing glass material. In some instances, the additive may include an alkali metal (such as lithium, sodium, potassium, calcium, fluorine, or bromine), a transition metal (such as copper or iron), or any combination thereof. In other instances, the additive may include lithium, nickel, manganese, copper, tri-methyl aluminum (TMA), tri-methyl gallium (TMG), sulfur, or any combination thereof.

The interphase region may extend from the surface-to-air interface of the carbon-containing glass material to a depth of approximately one micron into the carbon-containing glass material. In some implementations, an upper portion of the interphase region proximate to the surface-to-air interface has a relatively high concentration of FLG nanoplatelets, and a lower portion of the interphase region distal to the surface-to-air interface has a relatively low concentration of FLG nanoplatelets. In some aspects, the FLG nanoplatelets within the upper portion of the interphase region have a size of approximately 20 nanometers (nm), and the FLG nanoplatelets within the lower portion of the interphase region have a size of approximately 2 nm. In some implementations, the FLG nanoplatelets in a graded portion of the interphase region positioned between the upper and lower portions of the interphase region gradually decrease in size along the direction towards the depth of the interphase region. In some aspects, the FLG nanoplatelets in the lower portion of the interphase region are uniformly distributed across a plane of the lower portion of the interphase region. In addition, or in the alternative, a density of the plurality of FLG nanoplatelets may gradually decrease along the direction extending from the surface-to-air interface to the depth of the interphase region.

In various implementations, the additive may be configured to self-heal cracks formed in the carbon-containing glass material upon exposure of the additive to ambient air. For example, the additive may oxidize when exposed to reactants (such as gaseous oxygen, $O_2$, and/or moisture, ($H_2O$) present in ambient air, and the resulting oxidized additive can expand into cracks and/or surface defects formed in the carbon-containing glass material. In some aspects, the oxidized additive can also coat the surfaces of cracks and/or surface defects formed in the carbon-containing glass material. In some instances, the additive may be intercalated between adjacent graphene layers of the FLG nanoplatelets during a post-treatment operation. The post-treatment operation may include an isothermal treatment in a vacuum or in an inert atmosphere.

Another innovative aspect of the subject matter described in this disclosure can be implemented as a method of manufacture. In various implementations, the method may be used to manufacture, strengthen, and/or reinforce carbon-containing glass materials. In some implementations, the method may include supplying a non-thermal equilibrium plasma including a plurality of positive charged gas particles and a plurality of ionized inert gas particles into a reaction chamber. The method may include accelerating at least the plurality of positive charged gas particles through the reaction chamber based on application of an external electric potential to the non-thermal equilibrium plasma. The method may include bombarding a surface-to-air interface of the carbon-containing glass material with the accelerated positive charged gas particles and the ionized inert gas particles. The method may include forming an interphase region in the carbon-containing glass material in response to the bombardment by the accelerated positive charged gas particles and the ionized inert gas particles. The interphase region, which may extend from the surface-to-air interface along a direction orthogonal to the surface-to-air interface to a depth of approximately one micron within the carbon-containing glass material, can have a plurality of microcracks or micro-voids formed therein by the bombardment. In some instances, the microcracks or micro-voids may have a size between approximately 5 nanometers (nm) and 10 nm. The method may include forming a compressive stress layer in the carbon-containing glass material in response to the bombardment by at least the ionized inert gas particles. The compressive stress layer may be disposed between the interphase region and the surface-to-air interface of the carbon-containing glass material. The carbon-containing glass material may include silicate glass, soda-lime glass, alkali-aluminosilicate glass, borosilicate glass, or any combination thereof. In one implementation, the alkali-aluminosilicate glass consists of between approximately 57% to 60% $SiO_2$, between approximately 10% to 25% $Al_2O_3$, and approximately 10% alkali earth metals.

In some instances, the non-thermal equilibrium plasma may include an inherent electric potential. In some aspects, the electric potential inherent to the non-thermal equilibrium plasma may be sufficient for at least some of the positive charged gas particles and/or the ionized inert gas particles to penetrate the surface-to-air interface of the glass material without application of an external electric potential to the reaction chamber.

The method may also include implanting a plurality of carbon-based radicals separated from the non-thermal equilibrium plasma into the interphase region of the carbon-containing glass material concurrently with bombarding the surface-to-air interface with the accelerated positive charged gas particles and the ionized inert gas particles. The method may include forming a plurality of few layer graphene (FLG) nanoplatelets within the interphase region of the carbon-containing glass material based on a recombination and/or self-nucleation of the plurality of implanted carbon-based radicals. The carbon-based radicals may be implanted into the interphase region at one or more varying angles of incidence. In some aspects, an upper portion of the interphase region proximate to the surface-to-air interface may have a relatively high concentration of FLG nanoplatelets, and a lower portion of the interphase region distal to the surface-to-air interface may have a relatively low concentration of FLG nanoplatelets. In addition, the FLG nanoplatelets in the upper portion of the interphase region may have a size of approximately 20 nanometers (nm), and the FLG nanoplatelets in the lower portion of the interphase region may have a size of approximately 2 nm. In one implementation, the FLG nanoplatelets formed in a graded portion of the interphase region positioned between the upper and lower portions of the interphase region gradually decrease in size along the direction towards the depth of the interphase region. In some aspects, the FLG nanoplatelets in the lower portion of the interphase region may be uniformly distributed across a plane of the lower portion of the interphase region.

In some implementations, method may also include intercalating an additive between adjacent graphene layers within the FLG nanoplatelets formed in the interphase region. In some instances, the additive may include an alkali metal (such as lithium, sodium, potassium, calcium, fluorine, or bromine), a transition metal (such as copper or iron), or any combination thereof. In other instances, the additive may include lithium, nickel, manganese, copper, tri-methyl aluminum (TMA), tri-methyl gallium (TMG), sulfur, or any combination thereof. In one implementation, first portions of the additive intercalated in the FLG nanoplatelets formed within in the upper portion of the interphase region have a molar fraction of approximately 50%, and second portions of the additive intercalated in the FLG nanoplatelets formed within in the lower portion of the interphase region have a molar fraction of approximately 2%. Other portions of the additive implanted in an area of the interphase region between the upper and lower portions may have molar fractions that gradually decrease along the direction towards the depth of the interphase region.

The additive may be configured to self-heal cracks formed in the carbon-containing glass material upon exposure of the additive to reactants (such as gaseous oxygen, $O_2$, and/or moisture ($H_2O$)) present in ambient air. For example, the additive may oxidize when exposed to such reactants in ambient air, and the resulting oxidized additive can expand into cracks and/or surface defects formed in the carbon-containing glass material. In some aspects, the oxidized additive can also coat the surfaces of cracks and/or surface defects formed in the carbon-containing glass material.

Another innovative aspect of the subject matter described in this disclosure can be implemented in a carbon-containing glass material. In some implementations, the carbon-containing glass material may include a surface-to-air interface and an interphase region. The interphase region may extend from the surface-to-air interface along a direction orthogonal to the surface-to-air interface to a depth of approximately one micron into the carbon-containing glass material. The interphase region may include a plurality of few layer graphene (FLG) nanoplatelets formed in response to recombination and/or self-nucleation of a plurality of carbon-containing radicals implanted within the interphase region. The plurality of FLG nanoplatelets may have a non-periodic orientation configured to at least partially inhibit the formation or propagation of cracks and/or surface defects in the carbon-containing glass material.

In some implementations, the FLG nanoplatelets formed within an upper portion of the interphase region proximate to the surface-to-air interface may have a size of approximately 20 nanometers (nm), and the FLG nanoplatelets formed within a lower portion of the interphase region distal to the surface-to-air interface may have a size of approximately 2 nm. In some aspects, a density of the FLG nanoplatelets formed in the interphase region gradually decreases along the direction extending from the surface-to-air interface towards the depth of the interphase region. In some instances, the interphase region may have a fracture toughness of less than 50 Gigapascals (GPa). In addition, or in the alternative, the FLG nanoplatelets formed in the interphase region of the glass material may be configured to induce a compressive stress (CS) greater than 150 Megapascals (MPa) within the interphase region. In some aspects, each of the FLG nanoplatelets formed in the interphase region includes between 3 and 5 graphene layers stacked on top of one another, and have a combined weight of less than 2% of the carbon-containing glass material.

In various implementations, the interphase region may also include an additive intercalated between adjacent graphene layers within the FLG nanoplatelets formed in the interphase region. In some instances, the additive may include an alkali metal (such as lithium, sodium, potassium, calcium, fluorine, or bromine), a transition metal (such as copper or iron), or any combination thereof. In other instances, the additive may include lithium, nickel, manganese, copper, tri-methyl aluminum (TMA), tri-methyl gallium (TMG), sulfur, or any combination thereof. The additive may be configured to self-heal cracks formed in the carbon-containing glass material upon exposure of the additive to ambient air. For example, the additive may oxidize when exposed to ambient air, and the resulting oxidized additive can expand into cracks and/or surface defects formed in the carbon-containing glass material. In some aspects, the oxidized additive can also coat the surfaces of cracks and/or surface defects formed in the carbon-containing glass material.

In some implementations, the carbon-containing glass material may also include a compressive stress layer formed beneath the surface-to-air interface. In one implementation, the compressive stress layer may be formed by bombarding the surface-to-air interface of the carbon-containing glass material with a plurality of ionized inert gas particles. The ionized inert gas particles can penetrate the surface-to-air interface of the carbon-containing glass material and form microcracks or micro-voids in one or more portions of the interphase region. In some instances, the microcracks or micro-voids may have a size between approximately 5 nanometers (nm) and 10 nm.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The drawings described below are for illustration purposes only. The drawings are not intended to limit the scope of the present disclosure.

Like reference numbers and designations in the various drawings indicate like elements.

DETAILED DESCRIPTION

Figure 1:
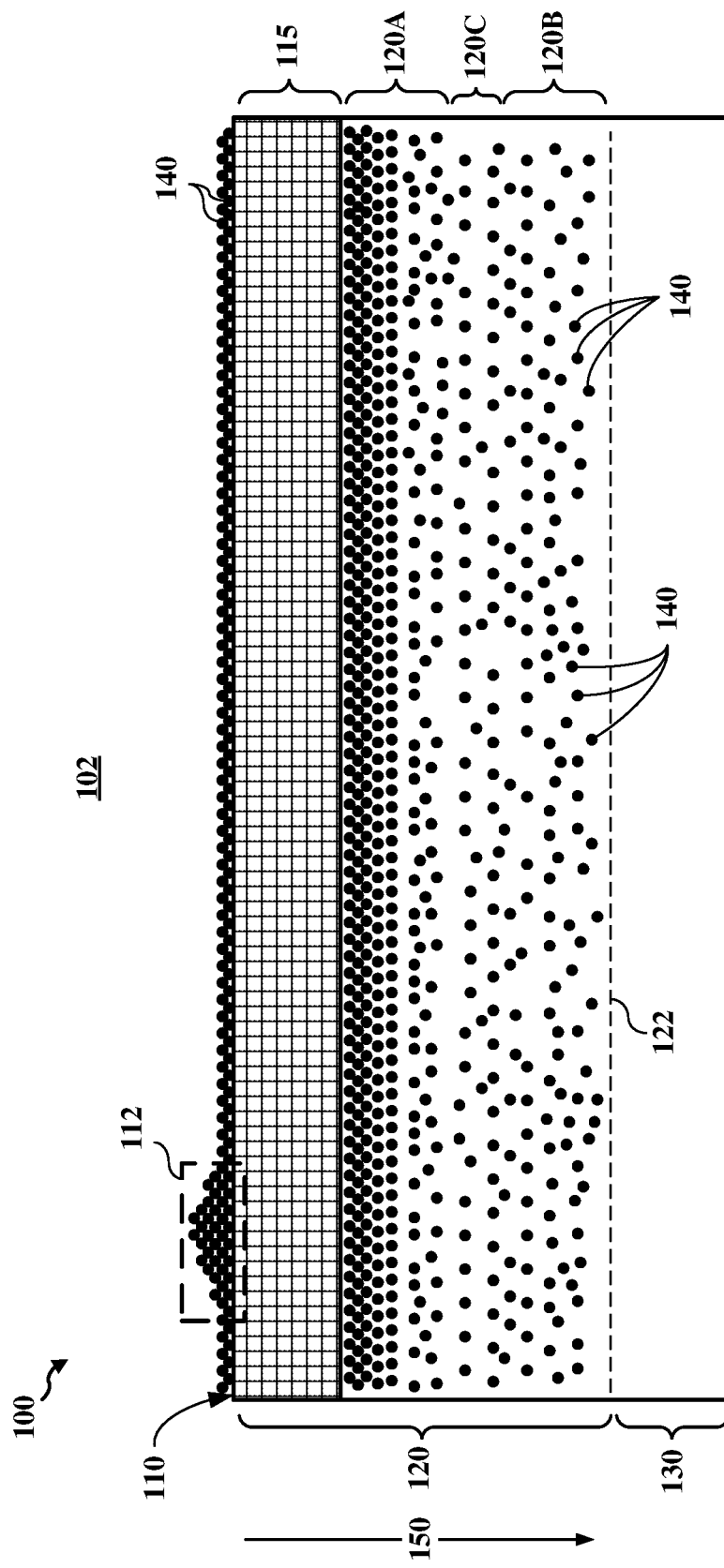
FIG. 1 shows an example carbon-containing glass material, according to some implementations.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The toughness of a material may indicate the ability of the material to withstand an applied force without experiencing mechanical fracture, and may depend at least in part on the compressive strength, tensile strength, and fracture toughness of the material. The compressive strength of a material may indicate the ability of the material to withstand an applied force, which can be measured in Pascals (Pa). The ultimate tensile strength (UTS) of a material may indicate the maximum stress that the material can withstand while being stretched or pulled before mechanical failure (such as before breaking into pieces). The fracture toughness of a material indicates the intrinsic ability of the material to resist fracturing and/or cracking.

Glass and glass-containing materials are also susceptible to cracking caused by external forces (such as by an object colliding into the glass). For example, when an external force equal to or greater than a certain fracture energy is applied to a glass material, the external force may cause the formation of cracks in the glass-containing material and/or may cause pre-existing cracks to expand and propagate throughout the glass material. Also, when a glass material experiences a compressive stress or a tensile stress, pre-existing flaws in the glass material (such as scratches and surface defects) may exacerbate the applied compressive stresses and/or tensile stresses, which in turn may cause relatively high stress concentrations at or near the pre-existing flaws. Portions of the glass material associated with relatively high stress concentrations may be more susceptible to crack formation and propagation than other portions of the glass material.

Conventional glass has a tensile strength of approximately 7 Megapascals (MPa), and has a theoretical maximum tensile strength of approximately 17 Gigapascals (GPa), which is several orders of magnitude higher than its typical tensile strength. The relatively high value of the theoretical maximum tensile strength of glass may be attributed to the strong chemical bonds between Silicon and Oxygen in Silicon Dioxide ($SiO_2$) molecules, which form the basis of many glass materials. However, imperfections and surface flaws (such as microcracks, fissures, and scratches) introduced into glass materials during conventional manufacturing techniques typically reduce the measured tensile strength of the glass materials from the theoretical maximum tensile strength to the typical tensile strength of approximately 7 MPa.

Applicant has determined that the relatively high fragility of glass can be caused by the introduction of impurities into glass during conventional manufacturing processes. These impurities, often introduced into glass as a strengthening mechanism, may decrease the compressive strength, tensile strength, and/or fracture toughness of the glass material. For example, when glass is heated, un-melted or undissolved portions of such impurities may cause the formation of one or more laminated layers on or within the glass material, which in turn may create internal stresses within the glass material that decrease the overall strength of the glass material. The un-melted or undissolved portions of these impurities may also inadvertently provide nucleation and growth sites for the formation and/or propagation of cracks throughout the glass. Moreover, conventional thermal strengthening processes and chemical strengthening processes may expose molten glass to moisture, dust, and other particulates in the surrounding ambient air, thereby exposing the glass to additional impurities that can further decrease the compressive strength, tensile strength, and/or fracture toughness of the glass material.

In accordance with various implementations of the subject matter disclosed herein, the surface-to-air interface of a glass material can be bombarded by carbon-based radicals, ionized inert gas particles, additives, positive charged particles, or any combination thereof. The glass material can be bombarded with the ionized inert gas particles and/or the positive charged particles, which can penetrate the surface-to-air interface of the glass material and create microcracks and/or micro-voids in an interphase region of the glass material. The carbon-based radicals can be implanted into the microcracks and/or micro-voids created in the interphase region by the bombardment. In some aspects, the carbon-based radicals can also be implanted into other portions of the glass material. The implanted carbon-based radicals can recombine and/or self-nucleate to form a plurality of FLG nanoplatelets throughout the interphase region. The FLG nanoplatelets can be dispersed throughout the interphase region in a random or non-periodic orientation that inhibits the formation and/or propagation of cracks in the glass material. In some aspects, one or more surfaces of the FLG nanoplatelets formed in the interphase region can be doped with the additive.

The additive can be intercalated between adjacent graphene layers of the FLG nanoplatelets dispersed throughout the interphase region. Thereafter, when the glass material develops one or more cracks in response to an external force applied to the glass material, portions of the additive intercalated within FLG nanoplatelets at or near the one or more cracks may be exposed to ambient air. Chemical reactions between the exposed additive and the ambient air can generate metal oxides that expand into and/or coat the surfaces of the one or more cracks formed in the glass material. The expansion of the metal oxides into the cracks, as well as the metal oxide coating formed on exposed surfaces of the cracks, can prevent or at least inhibit further propagation of the cracks in the glass material. In this way, the techniques disclosed herein can be used to manufacture, strengthen, and/or reinforce glass and glass materials without introducing undesirable impurities that can decrease the compressive strength, tensile strength, and/or fracture toughness of the glass or glass material.

FIG. 1 shows a carbon-containing glass material 100 that can be manufactured, strengthened, and/or reinforced in accordance with one or more aspects of the subject matter disclosed herein. The carbon-containing glass material 100 may be any suitable type of glass, glass-containing material, or carbon-containing glass material. In some implementations, the glass material 100 may be or include alkali-aluminosilicate glass having a composition of between approximately 57-60% $SiO_2$, between approximately 10-25% $Al_2O_3$, and approximately 10% alkali earth metal. In some aspects, the glass material 100 may have a thermal expansion of $9.8 \times 10^{-6}$/K. In other implementations, the glass material 100 may be or include (but is not limited to) borosilicate glass, silicate glass, or soda-lime glass. In some instances, the glass material 100 may be chemically strengthened using one or more conventional glass strengthening processes prior to the application of various glass strengthening techniques disclosed herein. For example, the glass material 100 may be chemically strengthened via thermal tempering, surface crystallization, and/or through the application of other chemicals to the glass material 100. In other instances, the glass material 100 may be a chemically strengthened glass such as Gorilla® Glass, which commercially available from Corning, Inc. of Corning, New York. In some other instances, the glass material 100 may be Dragontrail glass available from Asahi Glass Co., of Tokyo, Japan.

The glass material 100 is shown to include a surface-to-air interface 110, an interphase region 120, and a substrate region 130. The surface-to-air interface 110 may be exposed to an external environment containing an ambient air 102, and may provide an interface through which carbon-based radicals, ionized inert gas particles, additives, positive charged particles, and other particles or mixtures can penetrate and/or be implanted into the glass material 100 during manufacture. The interphase region 120 extends from the surface-to-air interface 110 along a direction 150 orthogonal to the surface-to-air interface 110 to a depth 122 of the glass material 100, and may be configured with one or more mechanisms to strengthen and/or reinforce the glass material 100. In some aspects, the depth 122 of the interphase region 120 may be approximately 1 micron, while in other aspects, the depth 122 of the interphase region 120 may be between approximately 1 and 10 microns. In some implementations, a monolayer 112 of excess carbon may be deposited and/or disposed on the interphase region 120. The monolayer of excess carbon may, in some aspects, assist in strengthening and/or toughening the interphase region 120 by providing a reinforcing material or substance available to absorb and/or dissipate energy from an impact or other source.

In various implementations, the interphase region 120 may be formed within the glass material 100 by bombarding the surface-to-air interface 110 with carbon-based radicals, ionized inert gas particles, additives, positive charged particles, and/or other suitable particles or materials. The carbon-based radicals may be (but are not limited to) methyl radicals. In some implementations, the carbon-based radicals and the ionized inert gas particles may be provided by (or extracted from) a non-thermal equilibrium plasma in a reaction chamber. The non-thermal equilibrium plasma may be generated by exciting hydrocarbon gas and silane with a microwave energy in the reaction chamber, for example, as described in more detail with reference to FIGS. 6 and 7.

The ionized inert gas particles, which may be (but are not limited to) Argon and/or Helium, may penetrate the surface-to-air interface 110 and "soften" one or more portions of the glass material 100, for example, by creating voids in the glass material 100. More specifically, the ionized inert gas particles may smash into various atoms, molecules, and particles of the glass material 100 and create the voids by displacing at least some of the smashed atoms, molecules, and particles. The ionized inert gas particles may have different masses and/or different sizes that can increase ion penetration depths and/or concentrations. In some instances, the voids created by the ionized inert gas particles may form a compressive stress layer 115 between the interphase region 120 and the surface-to-air interface 110. In some implementations, the compressive stress layer 115 may be induced by ion bombardment of the glass material 100 by a plurality of ionized inert gas particles (such as any of those presented and discussed with relation to FIGS. 6 and 7).

The carbon-based radicals may be implanted into voids and/or small fissures created by the bombardment of the glass material 100 by the ionized inert gas particles. Once implanted in the glass material 100, the carbon-based radicals may recombine and self-nucleate to form a plurality of few layer graphene (FLG) nanoplatelets 140 dispersed throughout the interphase region 120. The formation of FLG nanoplatelets 140 may lower the value of Young's modulus for the interphase region 120, thereby increasing the fracture toughness of the glass material 100. In some aspects, the FLG nanoplatelets 140 may lower the value of Young's modulus from approximately 50 GPa to approximately 150 MPa.

The FLG nanoplatelets 140 may be dispersed throughout the interphase region 120 in a random or non-periodic orientation that at least partially inhibits the formation or propagation of cracks and/or surface defects in the glass material 100. The FLG nanoplatelets 140 may also act as an energy reservoir that can absorb and/or dissipate external forces (such as fracture energies) appearing at or near cracks and crack tips in the glass material 100. In some implementations, the FLG nanoplatelets 140 formed in an upper portion 120A of the interphase region 120 proximate to the surface-to-air interface 110 may have a size of approximately 20 nanometers (nm), and the FLG nanoplatelets 140 formed in a lower portion 120B of the interphase region 120 distal to the surface-to-air interface 110 may have a size of approximately 2 nm. In some aspects, the FLG nanoplatelets in a graded portion 120C of the interphase region 120 positioned between the upper portion 120A and the lower portion 120B of the interphase region 120 gradually decrease in size along the direction 150 towards the depth 122 of the interphase region 120. In some instances, the FLG nanoplatelets 140 formed within interphase region 120 may have a combined weight of less than 2% of the glass material 100.

The density of the FLG nanoplatelets 140 formed in the interphase region 120 may gradually decrease along the direction 150 from the surface-to-air interface 110 to the depth 122 of the glass material 100. For example, the density of the FLG nanoplatelets 140 may decrease between approximately 0-5%, between approximately 5-10%, between approximately 10-15%, between approximately 15-20%, between approximately 20%-25%, between approximately 25%-30%, between approximately 30%-35%, between approximately 35%-40%, between approximately 40%-45%, between approximately 45%-50%, between approximately 50%-55%, between approximately 55%-60%, between approximately 60%-65%, between approximately 65%-70%, between approximately 70%-75%, between approximately 75%-80%, between approximately 80%-85%, between approximately 85%-90%, between approximately 90%-95%, and 95%-100% per unit depth. In some aspects, the per unit depth may be between approximately 10 nm and 50 nm. In other aspects, the per unit depth may be between approximately 50 nm and 100 nm.

In various implementations, the density of the FLG nanoplatelets 140 formed within the interphase region 120 of the glass material 100 can be controlled and fine-tuned by adjusting one or more aspects of the process by which the carbon-based radicals are implanted into the glass material 100. The compressive residual stress of the interphase region 120 may have a positive correlation to the density of the FLG nanoplatelets 140 formed in the interphase region 120. As such, the compressive residual stress of the interphase region 120 may be increased (or set to a relatively high value) by increasing the density of the FLG nanoplatelets 140 formed therein, and the compressive residual stress of the interphase region 120 may be decreased (or set to a relatively low value) by decreasing the density of the FLG nanoplatelets 140 formed therein. In this way, the compressive residual stress of the interphase region 110 may be tuned to a discrete level. For example, in some aspects, the compressive residual stress of the interphase region 110 may be tuned to a level between approximately 0 and 25 MPa, between approximately 25 and 50 MPa, between approximately 50 and 75 MPa, between approximately 75 and 100 MPa, between approximately 100 and 125 MPa, or approximately 125 MPa.

The additives may be any suitable material, particle, or mixture that can be implanted within the glass material 100 and configured to self-heal cracks or surface defects formed in the glass material 100. In some instances, the additives may include an alkali metal (such as lithium, sodium, potassium, calcium, fluorine, or bromine), a transition metal (such as copper or iron), or any combination thereof. In other instances, the additives may include lithium, nickel, manganese, copper, tri-methyl aluminum (TMA), tri-methyl gallium (TMG), sulfur, or any combination thereof. The additives may be implanted within one or more portions of the glass material 100 in any suitable manner. For example, in some aspects, the additives may be implanted within the glass material 100 concurrently with implanting the carbon-based radicals into the interphase region 120, while in other aspects, the additives may be implanted within the glass material 100 independently of the carbon-based radicals. In one implementation, the additives may be doped onto one or more surfaces of the FLG nanoplatelets 140 formed in the glass material 100. Once implanted within the glass material 100, the additives may be intercalated between adjacent graphene layers of the FLG nanoplatelets 140.

Thereafter, when the additive is exposed to ambient air, chemical reactions between the additive and certain components of ambient air (such as $H_2O$ and $O_2$ molecules) may oxide the additive. The oxidized additive may expand into and/or coat the surfaces of cracks, fissures, and surface defects proximate to the intercalated FLG nanoplatelets 140. For example, when the glass material 100 develops one or more cracks in response to an external force applied to the glass material 100, portions of the additive intercalated within FLG nanoplatelets 140 at or near the cracks, fissures, and surface defects may be exposed to the ambient air 102. Chemical reactions between the exposed additive and the ambient air 102 can generate metal oxides that expand into and/or coat the surfaces of the cracks, fissures, and surface defects formed in the glass material 100. The expansion of the metal oxides into the cracks, fissures, and surface defects, as well as the metal oxide coating on exposed surfaces of the cracks, fissures, and surface defects, can prevent or at least inhibit further propagation of the cracks, fissures, and surface defects in the glass material 100. In this way, the techniques disclosed herein can be used to manufacture, strengthen, and/or reinforce glass and glass materials without introducing undesirable impurities that can decrease the compressive strength, tensile strength, and/or fracture toughness of the glass or glass material.

In some implementations, the non-thermal equilibrium plasma may also include a plurality of positive charged particles that can be separated from the carbon-based radicals and the ionized inert gas particles in the reaction chamber. An external electric field or potential may be used to accelerate the positive charged particles through the reaction chamber, thereby increasing the speed and energy with which the positive charged particles can impact the surface-to-air interface 110 of the glass material 100. In this way, the accelerated particles may penetrate the glass material 100 with greater energy and further soften the one or more portions of the glass material 100 that define the interphase region 120.

In one implementation, the formation of the FLG nanoplatelets 140 within the interphase region 120 may be controlled to adjust the temporal and spatial aspects of intrinsic strain fields within the interphase region 120. For example, the carbon-based radicals implanted into the glass material 100 may recombine to form ordered 2D $sp^2$ FLG nanoplatelets having a defined density and size distribution within a region of the interphase region 120 less than approximately 1 mm beneath the surface-to-air interface 110. In some aspects, the intrinsic strain fields may be the result of controlled self-nucleation and growth of 2D $sp^2$ graphene nanoparticles within the reaction chamber prior to implantation in the interphase region 120 of the glass material 100. The controlled self-nucleation and growth of 2D $sp^2$ graphene nanoparticles within the reaction chamber may result from the presence of supersaturation levels of energized carbon-based radicals in the non-equilibrium plasma from which the carbon-based radicals are generated.

In some other implementations, additional carbon-based particles may be flowed into the reaction chamber and thereafter implanted within the interphase region 120 of the glass material 100. These additional carbon-based particles may further increase the fracture toughness of the interphase region 120 and/or may further inhibit the formation and propagation of cracks throughout the glass material 100. In some aspects, these additional carbon-based particles, which may be referred to as secondary carbon particles, may be implanted within the upper portion 120A of the interphase region 120.

In some aspects, different hydrocarbon precursor supply gases (such as methane, ethanol with different C/H ratios, ethanol with different oxygen content, etc.) may be used to create specific plasma chemistries (such as C+, $C_2$, $CH_3\cdot$, $O^-$, etc.) from which the carbon-based radicals are generated and thereafter implanted in the interphase region 120 of the glass material 100. In some aspects, the size of the FLG nanoplatelets 140 may be selected or adjusted based on a particular purpose of the resulting graphene formation. For example, FLG nanoplatelets used for tuning various quantum effects of the glass material 100 may have a size less than 5 nm, while FLG nanoplatelets used for tuning optical transmission or absorption properties of the glass material 100 may have a size between approximately 5 and 50 nm.

The FLG nanoplatelets 140 may cause the interphase region 120 to have a different index of refraction than the substrate portion 130 of the glass material 100. In one implementation, the FLG nanoplatelets 140 formed in the interphase region 120 may be configured such that optical transmission variances caused by scattering at the surface-to-air interface 110 of the glass material 100 is less than approximately 0.5%.

The formation of FLG nanoplatelets 140 within the interphase region 120, as well as the penetration of energized ions therein, may result in the interphase region 120 having an engineered gradation that exhibits a linear to gaussian profile. In some aspects, one or more mechanical, chemical, electrical, and/or optical properties can be adjusted based on the concentration of the FLG nanoplatelets 140 formed within the interphase region 120. The FLG nanoplatelets 140 formed within the interphase region 120 may also increase fracture toughness of the glass material 100 by dissipating fracture energy and other external forces applied to the glass material 100. In this way, forming the FLG nanoplatelets 140 within interphase region 120 based on techniques disclosed herein may reinforce the glass material 100 without introducing undesirable impurities into the glass material 100.

Figure 2:
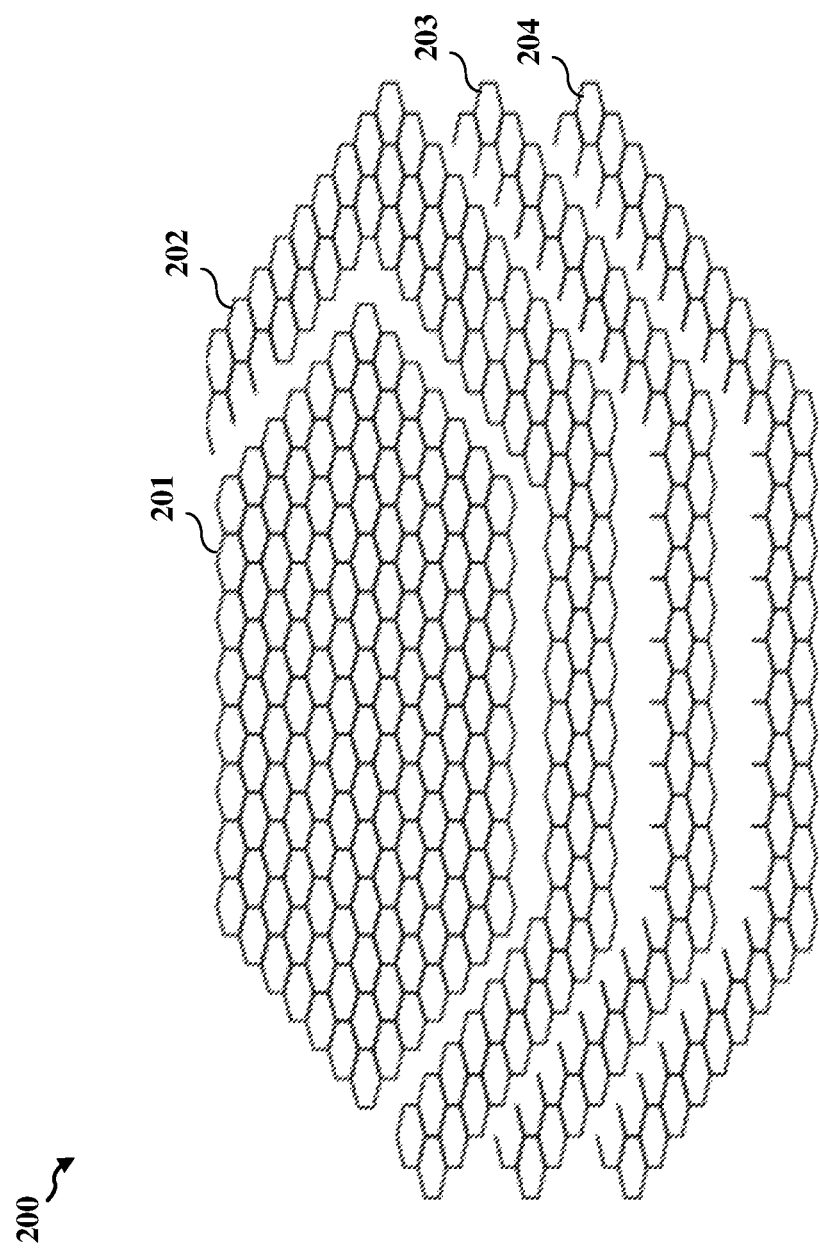
FIG. 2 shows an example FLG nanoplatelet that can be formed in the carbon-containing glass material of FIG. 1, according to some implementations.

FIG. 2 shows an example FLG nanoplatelet 200 that may be formed within the glass material 100 of FIG. 1, according to some implementations. The FLG nanoplatelet 200, which may be one example of the FLG nanoplatelets 140 formed in the glass material 100 of FIG. 1, may have a buckled or crinkled structure in which groups of carbon-carbon bonded atoms may flex or fold in response to an external force, pressure, or load. For example, when an external force is applied to the glass material 100, the presence of the FLG nanoplatelets 140 in the interphase region 120 may cause the glass material 100 to flex, bend, and/or fold in response to the applied force (such as rather than cracking or fracturing). In this way, glass and glass materials manufactured, strengthened, and/or reinforced using techniques disclosed herein can absorb and/or dissipate energy and stresses associated with the applied forces, pressures, and load, and thereby reduce the overall compressive stress experienced by the glass material 100.

For the example of FIG. 2, the FLG nanoplatelet 200 is shown to include four graphene layers 201-204 stacked (such as vertically or substantially vertically) on top of one another. In other implementations, the FLG nanoplatelet 200 may include other numbers of graphene layers. The number of graphene layers in FLG nanoplatelet 200 may affect one or more properties of the FLG nanoplatelet 200. These properties may include (but are not limited to) the ability to absorb or dissipate energy, the ability to conduct electricity, and the ability to self-heal cracks formed in glass and glass materials. For example, increasing the number of graphene layers in the FLG nanoplatelet 200 may increase the ability of the glass material 100 to absorb or dissipate energy, may increase the ability of the glass material 100 to conduct electricity, and may increase the ability of the glass material 100 to self-heal cracks and other surface defects. Thus, for at least some implementations, the FLG nanoplatelets 140 formed in the glass material 100 of FIG. 1 may have a relatively large number of graphene layers (such as 10 or more graphene layers), for example, to maximize the ability of the glass material 100 to absorb energy, dissipate energy, conduct electricity, and self-heal cracks.

However, increasing the number of graphene layers in the FLG nanoplatelet 200 increases the thickness of the FLG nanoplatelet 200, which in turn increases the opacity of the FLG nanoplatelet 200. In general, opacity is a measure of impenetrability to electromagnetic radiation and light. For example, an opaque material is neither transparent (such as allowing all received light to pass through the material) nor translucent (such as allowing only some of the received light to pass through the material), but rather reflects, scatters, and/or absorbs all received light. Moreover, when light strikes an interface between two layers, materials, formations, and/or substances in a material, some of the light may not be transmitted through the interface. That is, some of the light may be absorbed by the interface, some of the light may be absorbed by the interface, and some of the light may be scattered by the interface (and the rest transmitted through the material). As a result, when the FLG nanoplatelet 200 includes more than a certain number of graphene layers or exceeds a certain thickness, the opacity of the FLG nanoplatelet 200 may exceed a threshold value such that glass materials having a network of FLG nanoplatelets 200 formed therein are no longer suitable for some optical applications. For example, such that the reinforced glass material 100 may no longer be suitable for optical applications Applicant has determined that when formed within a glass material (such as the carbon-containing glass material 100 of FIG. 1), FLG nanoplatelets 200 having between 3 and 5 graphene layers provide a desired balance between the ability of the glass material to absorb energy, dissipate energy, conduct electricity, and self-heal cracks and the optical transparency of the glass material (such as the ability to pass light with less than a threshold amount of loss and/or refraction). Applicant has also determined that FLG nanoplatelets 200 formed within the interphase region 120 of the glass material 100 have a thickness between approximately 1 nm and 3 nm and have lateral dimensions (such as length and width) between approximately 100 nm and 100 µm. In one implementation, the FLG nanoplatelets 200 formed in the upper portion 120A of the interphase region 120 have lateral dimensions of approximately 20 nm, and the FLG nanoplatelets 200 formed in the lower portion 120B of the interphase region 120 have lateral dimensions of approximately 2 nm.

Figure 3:
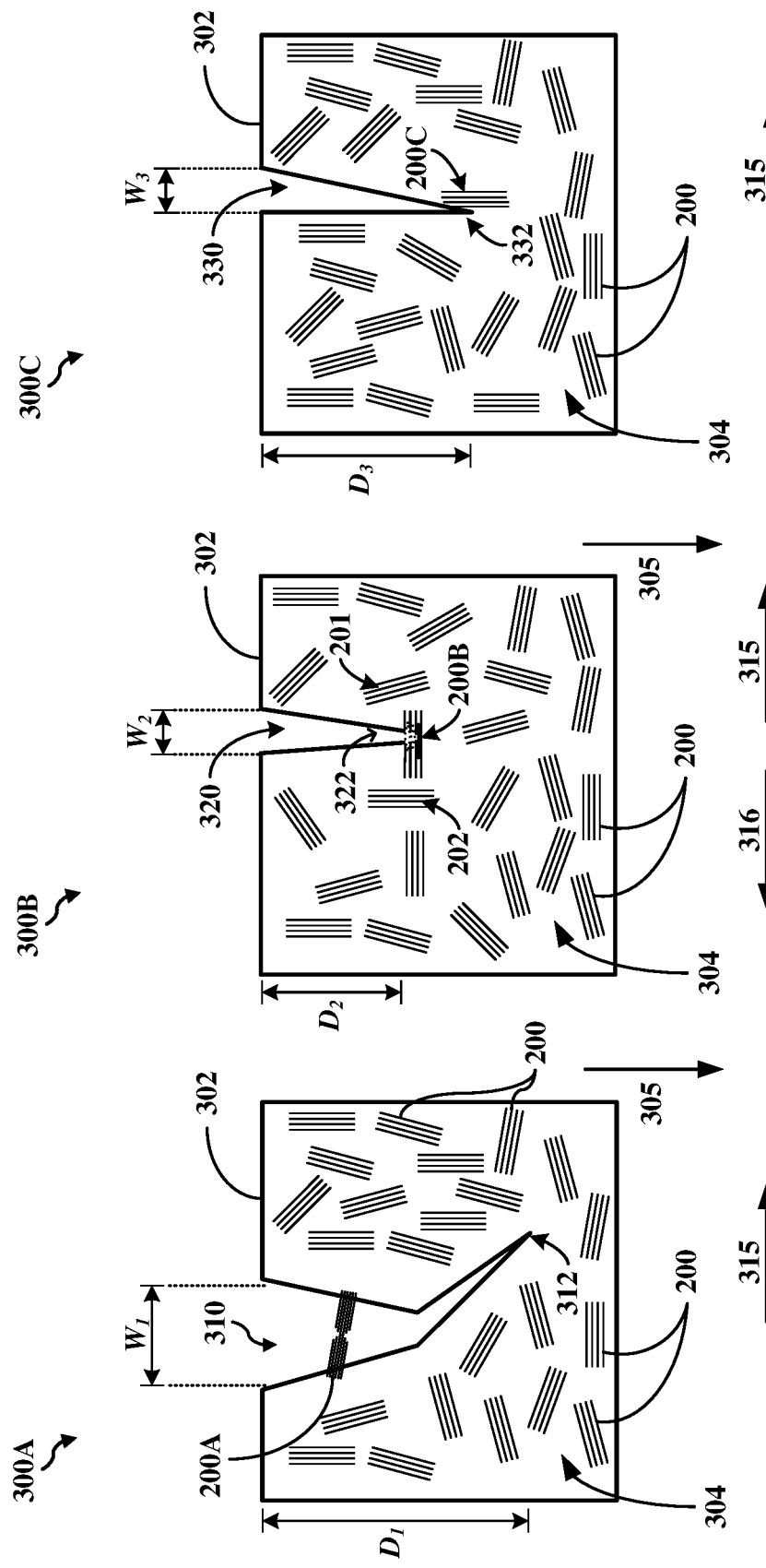
FIG. 3A depicts an example toughening mechanism that can be used in the carbon-containing glass material of FIG. 1, according to some implementations.
FIG. 3B depicts another example toughening mechanism that can be used in the carbon-containing glass material of FIG. 1, according to some implementations.
FIG. 3C depicts another example toughening mechanism that can be used in the carbon-containing glass material of FIG. 1, according to some implementations.

FIG. 3A depicts an example mechanism 300A for toughening a glass material, according to some implementations. The glass material includes a surface-to-air interface 302 and an interphase region 304. The surface-to-air interface 302, which may be one example of the surface-to-air interface 110 of FIG. 1, may provide an interface through which various particles and materials can be bombarded, implanted, and/or doped into the glass material. The interphase region 304, which may be one example of the interphase region 120 of FIG. 1, includes a plurality of FLG nanoplatelets 200 formed therein, for example, as described above with reference to FIGS. 1 and 2. As shown in FIG. 3A, the glass material also includes a crack 310 having a width $W_1$ across the surface-to-air interface 302 and a depth $D_1$ extending into the glass material. The crack 310 is also shown to include a crack tip 312.

One of the FLG nanoplatelets 200, denoted as FLG nanoplatelet 200A in FIG. 3A, is shown to "bridge" the crack 310. That is, a first end of the FLG nanoplatelet 200A is bonded to portions of the glass material to the right of the crack 310, and a second end of the FLG nanoplatelet 200A is bonded to portions of the glass material to the left of the crack 310. As a result of this bridging, the FLG nanoplatelet 200A can absorb and/or dissipate forces, stresses, and loads applied to portions of the glass material near the crack 310. Additionally, because the crack 310 is most likely to propagate in a downward vertical direction 305 in response to a tensile stress that pulls opposite sides of the crack 310 away from one another, the position and orientation of the FLG nanoplatelet 200A relative to the crack 310 can steer propagation of the crack 310 to a lateral direction 315 that is orthogonal to the vertical direction 305 and parallel to the surface-to-air interface 302 of the glass material.

In various implementations, additives may be intercalated between adjacent graphene layers of the FLG nanoplatelets 200 formed in the glass material (additives not shown in FIG. 3A for simplicity). In some instances, the additives may be doped onto one or more surfaces of at least some of the FLG nanoplatelets 200. The additives can oxidize upon exposure to ambient air and form an oxidized material that expands into and/or coats the surfaces of cracks 310 formed in the glass material. In some instances, the additives may include an alkali metal (such as lithium, sodium, potassium, calcium, fluorine, or bromine), a transition metal (such as copper or iron), or any combination thereof. In other instances, the additives may include lithium, nickel, manganese, copper, tri-methyl aluminum (TMA), tri-methyl gallium (TMG), sulfur, or any combination thereof. In this way, the presence of such additives intercalated within the FLG nanoplatelets 200 can self-heal the crack 310 (and other cracks, not shown for simplicity) formed in the glass material.

In some implementations, surface energy effects may cause the intercalated additives to form spheres on or near the surfaces of respective FLG nanoplatelets 200. In some instances, the metal spheres may have a diameter between approximately 1 and 5 nm. The metal spheres may diffuse upon application of an external force and create voids between the FLG nanoplatelets 200 (such as based on the Kirkendall effect). At least some of the voids may absorb and/or dissipate fracture energy present at the crack tip 312, thereby preventing further propagation of the crack 310 into or across the glass material.

FIG. 3B depicts an example mechanism 300B for toughening a glass material, according to other implementations. The glass material includes a surface-to-air interface 302 and an interphase region 304. The surface-to-air interface 302, which may be one example of the surface-to-air interface 110 of FIG. 1, may provide an interface through which various particles and materials can be bombarded, implanted, and/or doped into the glass material. The interphase region 304, which may be one example of the interphase region 120 of FIG. 1, includes a plurality of FLG nanoplatelets 200 formed therein, for example, as described above with reference to FIGS. 1 and 2. As shown in FIG. 3B, the glass material also includes a crack 320 having a width $W_2$ across the surface-to-air interface 302 and a depth $D_2$ extending into the glass material. The crack 320 is also shown to include a crack tip 322.

One of the FLG nanoplatelets 200, denoted as FLG nanoplatelet 200B in FIG. 3B, is positioned beneath the crack tip 322 and oriented substantially orthogonal to the depth $D_2$ of the crack 320. When the crack 320 is subjected to an applied force that causes the crack 320 to begin propagating in the downward vertical direction 305, the FLG nanoplatelet 200B situated beneath the crack tip 322 may absorb and/or diffuse an amount or portion of the applied force such that the crack does not propagate further than the FLG nanoplatelet 200B. In some instances, the orthogonal orientation of the FLG nanoplatelet 200B relative to the crack 320 may cause the crack 320 to "branch" and form one or more microcracks at or near the crack tip 322. The microcracks are relatively small and have relatively low energies compared to the crack 320, and therefore may not propagate laterally in direction 315 beyond FLG nanoplatelet 201 or propagate laterally in direction 316 beyond FLG nanoplatelet 202. More specifically, because FLG nanoplatelets 201 and 202 are oriented orthogonally relative to the lateral microcracks, the lateral microcracks may not have sufficient energy to penetrate or break the FLG nanoplatelets 201 and 202. In this way, the FLG nanoplatelet 200B may inhibit the vertical propagation of the crack 320 (and other cracks, not shown for simplicity) through the glass material, and FLG nanoplatelets 201 and 202 may inhibit the lateral propagation of the microcracks through the glass material.

FIG. 3C depicts an example mechanism 300C for toughening a glass material, according to some implementations. The glass material includes a surface-to-air interface 302 and an interphase region 304. The surface-to-air interface 302, which may be one example of the surface-to-air interface 110 of FIG. 1, may provide an interface through which various particles and materials can be bombarded, implanted, and/or doped into the glass material. The interphase region 304, which may be one example of the interphase region 120 of FIG. 1, includes a plurality of FLG nanoplatelets 200 formed therein, for example, as described above with reference to FIGS. 1 and 2. As shown in FIG. 3C, the glass material also includes a crack 330 having a width $W_3$ across the surface-to-air interface 302 and a depth $D_3$ extending into the glass material. The crack 330 is also shown to include a crack tip 332.

One of the FLG nanoplatelets 200, denoted as FLG nanoplatelet 200C in FIG. 3C, is adjacent the crack tip 332 and oriented substantially parallel to the crack 330. When the crack 330 is subjected to an applied force that causes the crack 320 to begin propagating in the lateral direction 315 towards the FLG nanoplatelet 200C, the graphene layers within the FLG nanoplatelet 200C exhibit sliding movements relative to one another that can absorb and/or dissipate at least some of the applied force, for example, and thereby inhibit further propagation of the crack 330 through the glass material.

Figure 4:
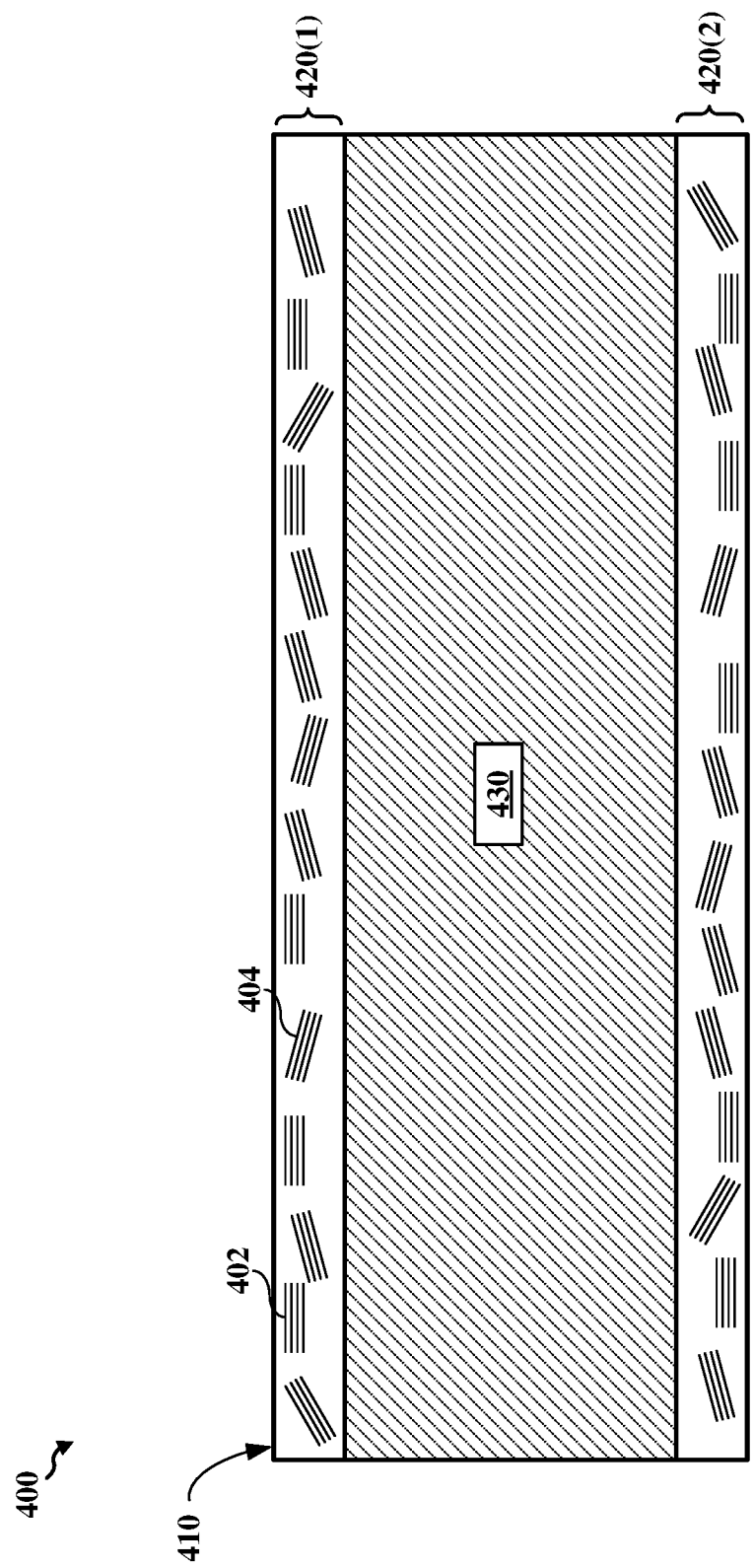
FIG. 4 shows an example carbon-containing glass material having more than one interphase region, according to some implementations.

FIG. 4 shows an example carbon-containing glass material 400 having more than one interphase region, according to some other implementations. As shown, the glass material 400 may include a first interphase region 420(1), a second interphase region 420(2), and a third region 430. Each of the first interphase region 420(1) and the second interphase region 420(2) may include a plurality of FLG nanoplatelets (such as formed by recombination or self-nucleation of carbon-based radicals implanted or bombarded into the glass material). In some implementations, each of the first interphase region 420(1) and the second interphase region 420(2) may be examples of the interphase region 120 of the glass material 100 of FIG. 1. That is, each of the first interphase region 420(1) and the second interphase region 420(2) may have a plurality of FLG nanoplatelets 402, 404 formed therein to strengthen and/or reinforce the glass material 400. Alignment of the FLG nanoplatelets 402, 404 may, in some aspects, reduce potential surface flaws or damage to first interphase region 420(1) and second interphase region 420(2). In some aspects, the FLG nanoplatelets 402, 404 inside first interphase region 420(1) and second interphase region 420(2) may be formed in different orientations. For example, the first FLG nanoplates 402 may have a first orientation, and the second FLG nanoplates 404 may have a second orientation that is different than the first orientation. The first interphase region 420(1) may also include other FLG nanoplatelets (not shown for simplicity) having one or more orientations that are different than the first orientation and the second orientation.

The FLG nanoplatelets 402, 404 formed within various portions of the glass material 400 may form a graphene network integrated within various molecular structures of the glass material 400. The graphene network, which in some aspects may resemble grain boundaries observed in nanocrystalline-matrix structures, may extend laterally (such as along a width and length) across the glass material 400 and form a toughening or strengthening mechanism that can increase the compressive strength, the tensile strength, and the fracture toughness of the glass material 400.

Figure 5:
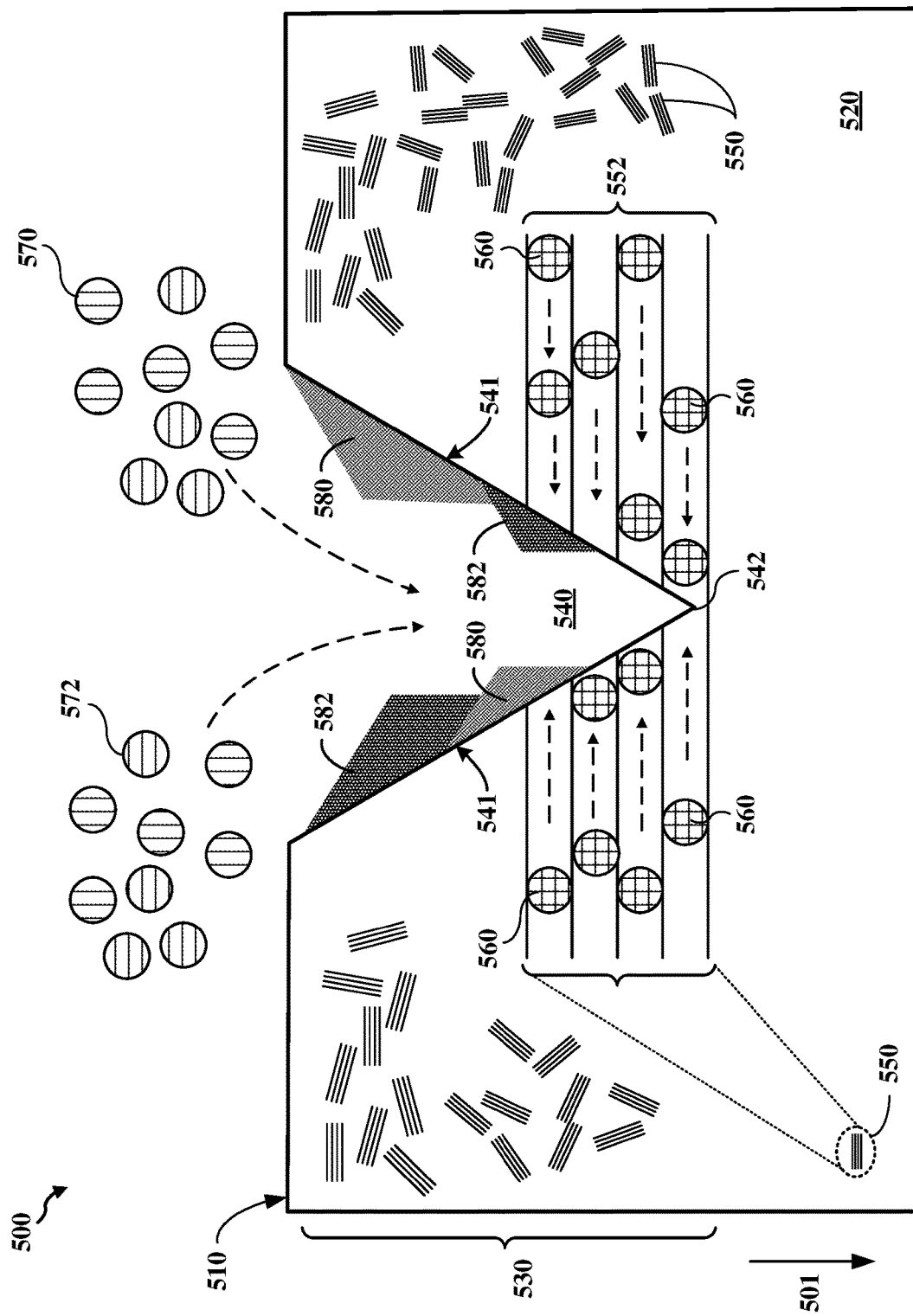
FIG. 5 depicts a portion of the carbon-containing glass material of FIG. 1, according to some implementations.

FIG. 5 depicts a portion of a carbon-containing glass material 500, according to some other implementations. The glass material 500, which may be one example of the glass material 100 of FIG. 1, is shown to include a surface-to-air interface 510, an interphase region 520, a self-healing layer 530, a crack 540 formed in the glass material 500, and a plurality of FLG nanoplatelets 550 formed within the glass material 500. For simplicity, portions of the glass material 500 beneath the interphase region 520 are not shown in FIG. 5.

As shown, the self-healing layer 530 may be disposed within the interphase region 520 of the glass material, and may extend to the surface-to-air interface 510 of the glass material 500. One or more additives 560 may be intercalated between adjacent graphene layers 552 of at least some of the FLG nanoplatelets 550 formed within the glass material (for simplicity, the graphene layers 552 of only one FLG nanoplatelet 550 are shown in FIG. 5). In some instances, the additive may include an alkali metal (such as lithium, sodium, potassium, calcium, fluorine, or bromine), a transition metal (such as copper or iron), or any combination thereof. In other instances, the additive may include lithium, nickel, manganese, copper, tri-methyl aluminum (TMA), tri-methyl gallium (TMG), sulfur, or any combination thereof.

When the crack 540 propagates from the surface-to-air interface 510 of the glass material 500 in a downward vertical direction 501 into the self-healing layer 530, the crack 540 exposes a group of FLG nanoplatelets 550 at or near the crack tip 542 to ambient air. Chemical reactions between additives intercalated within the group of FLG nanoplatelets 550 and certain components of the ambient air (such as oxygen ($O_2$) molecules 570 and water ($H_2O$) molecules 572) generate oxides (such as metal oxides 580 and/or metal oxide-hydroxides 582) that expand into and/or coat exposed surfaces 541 of the crack 540. The expansion of the oxides 580 and/or 582 into the crack 540 and the resultant coating on the exposed surfaces 541 of the crack 540 prevent or at least inhibit further propagation of the crack 540 through the glass material 500. In this way, the techniques disclosed herein can be used to manufacture, strengthen, and/or reinforce the glass material 500 without introducing undesirable impurities that can decrease the compressive strength, tensile strength, and/or fracture toughness of the glass material 500.

In some implementations, a thermal or microwave energy may be applied to the glass material 500 during manufacture (such as within a reaction chamber) to increase diffusion of the additives 560 into the crack tip 542, which may increase the rate at which the metal oxides 580 and metal oxide-hydroxides 582 are generated.

Figure 6:
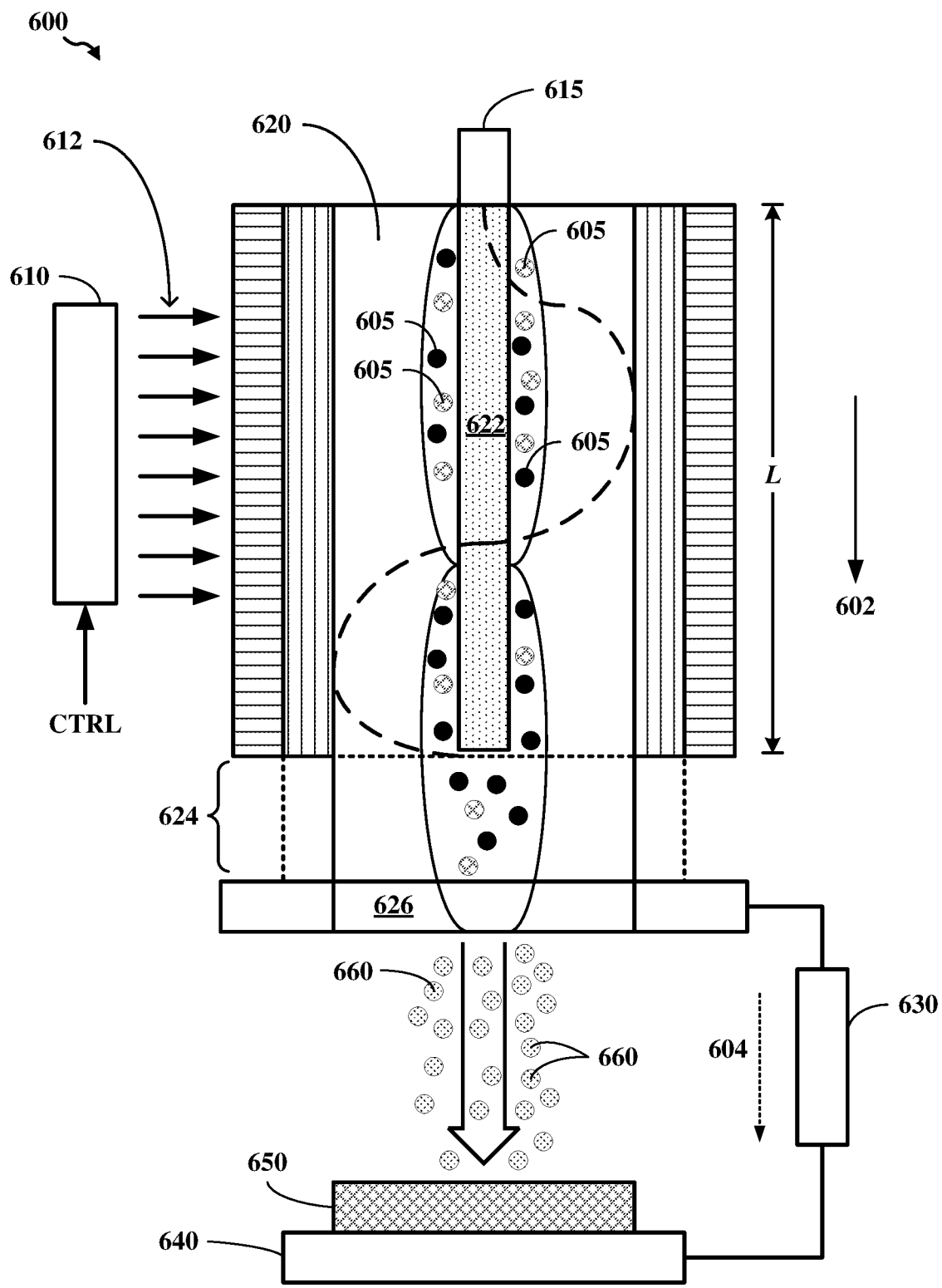
FIG. 6 shows an example reactor that can be used to manufacture, strengthen, and/or reinforce carbon-containing glass materials, according to some implementations.

FIG. 6 shows an example reactor 600 that can be used to manufacture, strengthen, and/or reinforce carbon-containing glass materials, according to some implementations. In some instances, glass materials strengthened and/or reinforced using techniques described herein may become more resilient to the propagation of existing cracks and/or to the formation of new cracks when an external force is applied to the glass material 650. In addition, or in the alternative, the reactor 600 may implemented as a plasma torch.

The reactor 600 may include a microwave energy source 610, an input gas inlet 615, a reaction vessel 620, an electric potential source 630, and a metal substrate 640. The reaction vessel 620 may include a reaction chamber 622, a downstream region 624, and a collector 626. The reaction chamber 622 has a length L along a direction 602 parallel to the reaction chamber 622. The input gas inlet 615 is coupled between the reaction vessel 620 and a process material source (not shown for simplicity), and may be used to flow or otherwise provide materials 605 (such as one or more gases, liquids, particles, etc.) into the reaction chamber 622. For example, in some instances, the materials 605 may include various structured carbons such as (but not limited to) CNTs, fullerenes, and the like.

The microwave energy source 610 may generate a microwave energy 612 that can excite the materials 605 to generate a plasma from which carbon-based radicals can be separated or extracted. In some instances, the microwave energy source 610 may generate a pulsed microwave energy, for example, as described in commonly owned U.S. Pat. Nos. 9,767,992 and 10,314,512. In other instances, the microwave energy source 610 may generate a continuous microwave energy. The microwave energy source 610 may include control circuitry that can adjust various characteristics of the microwave energy 612 based on one or more control signals (CTRL). For example, the CTRL signals may determine one or more of a pulse duration, a pulse frequency, a duty cycle, an instantaneous power level, or an average power level of the microwave energy 612. In this way, the reactor 600 may configure the sizes, numbers of graphene layers, and concentrations of FLG nanoplatelets to be formed in the glass material 650 by adjusting the pulse duration, pulse frequency, duty cycle, instantaneous power level, and/or average power level of the microwave energy 612 generated to create the non-thermal equilibrium plasma in the reaction chamber 622. The ability to control the energy applied to the non-thermal equilibrium plasma allows targeted reactions to occur and facilitates the distribution of FLG nanoplatelets and other particles throughout the glass material 650.

In some implementations, a mixture of hydrocarbon gas and silane may be flowed into the reaction chamber 622 through the input gas inlet 615 at a suitable flow rate. The hydrocarbon gas may be any suitable carbon-containing gas such as (but not limited to) methane gas. The silane may be any suitable silane gas or silane-containing liquid precursor. In some aspects, the silane may be flowed into the reaction chamber 622 at a flow rate between approximately 1 standard liter per minute (slm) and 10 slm per minute. In some aspects, additives may be provided to the reaction chamber 622, for example, concurrently with flowing the mixture into the reaction chamber 622. In some instances, the additive may include an alkali metal (such as lithium, sodium, potassium, calcium, fluorine, or bromine), a transition metal (such as copper or iron), or any combination thereof. In other instances, the additive may include lithium, nickel, manganese, copper, tri-methyl aluminum (TMA), tri-methyl gallium (TMG), sulfur, or any combination thereof. The additive may be flowed into the reactor at a flow rate that is between approximately 1% to 75% of the flow rate of the hydrocarbon gas.

Microwave energy 612 generated by the microwave energy source 610 can be directed into portions of the reaction chamber 622 containing the mixture of hydrocarbon gas and silane. The microwave energy 612, which may have a power level between approximately 300 watts (W) and 25 kilowatts (kW), can excite the mixture of hydrocarbon gas and silane to produce a non-thermal equilibrium plasma. In some aspects, the microwave energy source 610 can be a klystron or a traveling wave tube amplifier (TWTA). The non-thermal equilibrium plasma may include carbon-based radicals (such as methyl radicals), positive charged particles, ionized inert gas particles, or any combination thereof. In various implementations, the carbon-based radicals, the positive charged particles, and/or the ionized inert gas particles 660 output from the reaction chamber 622 via the collector 626 can be directed towards a surface-to-air interface of the glass material 650 via bombardment and/or implantation. The glass material 650 may be bombarded by the carbon-based radicals, the positive charged particles, and/or the ionized inert gas particles to form, strengthen, and/or reinforce one or more portions of the glass material 650. The portions of glass material 650 formed, strengthened, or reinforced in accordance with the techniques disclosed herein may have increased compressive strength, increased tensile strength, and increased fracture toughness, and are therefore more resilient to cracking and surface defects than conventional glass materials.

More specifically, the surface-to-air interface of the glass material 650 may be bombarded with carbon-based radicals and ionized inert gas particles separated from the non-thermal equilibrium plasma in the reaction chamber 622. The ionized inert gas particles may penetrate the surface-to-air interface of the glass material 650 and form microcracks, micro-voids, and/or surface defects within portions of the glass material 650 beneath the surface-to-air interface. In some aspects, the microcracks, micro-voids, and/or surface defects formed by ion-bombardment of the glass material 650 may define an interphase region of the glass material 650. The carbon-based radicals that penetrated the surface-to-air interface of the glass material 650 may be implanted within the interphase region.

In some implementations, an external electric field may be applied to the reaction chamber 622 to accelerate the positive charged particles through the reaction chamber 622 along a direction 604 towards the glass material 650, thereby increasing the speed and energy with which the positive charged particles can impact the surface-to-air interface of the glass material 650. For example, the electric potential source 630 may generate a negative electric field or potential that can accelerate the positive charged particles along the direction 604 towards the glass material 650 situated on the metal substrate 640. In some aspects, the negative electric potential generated by the electric potential source 630 may be configured to extract or separate positive charged gas particles from the non-thermal equilibrium plasma based on electric polarities. In this way, the negative electric field or potential may allow positive charged particles, as wells as ionized inert gas particles and carbon-based radicals, to penetrate deeper into the interphase region of the glass material 650.

The carbon-based radicals implanted within the interphase region of the glass material 650 may recombine and self-nucleate to form a plurality of FLG nanoplatelets. The FLG nanoplatelets may be dispersed throughout the interphase region of the glass material 650 in a non-periodic orientation that at least partially inhibits the formation or propagation of cracks in the glass material 650. In some aspects, the FLG nanoplatelets formed in the interphase region may increase the fracture toughness of the glass material 650 by reducing the value of Young's modulus in the interphase region such as (but not limited to) from approximately 50 GPa to approximately 150 MPa. The FLG nanoplatelets formed in the interphase region may also act as an energy reservoir that absorbs and/or dissipates external forces applied to existing cracks and/or crack tips in the glass material 650.

As discussed, the concentration and size of the FLG nanoplatelets formed in the glass material 650 may decrease along the direction 604 to the depth of the interphase region. For example, in some implementations, the FLG nanoplatelets formed in an upper portion of the interphase region of the glass material 650 may have a size of approximately 20 nanometers (nm), and the FLG nanoplatelets formed in a lower portion of the interphase region of the glass material 650 may have a size of approximately 2 nm. In some instances, the size of the FLG nanoplatelets formed between the upper and lower portions of the interphase region may gradually decrease in size along the direction 604.

In some implementations, one or more surfaces of the FLG nanoplatelets formed in the interphase region of the glass material 650 may be doped with additives, as discussed above. The additives, which may be intercalated between adjacent graphene layers of at least some of the FLG nanoplatelets formed within the interphase region of the glass material 650, can self-heal cracks and other surface defects in the glass material 650 when exposed to ambient air, for example, as discussed above with reference to FIGS. 1, 2, 3A-3C, 4, and 5.

In various implementations, the reactor 600 may be cylindrically-shaped with a diameter up to 1 inch. In some implementations, the reactor 600 may be configured as Gaussian reactors, while in other implementations, the reactor 600 may be configured as non-Gaussian reactors (such as where plasmas generated in non-Gaussian reactors typically exhibit a superior energy dissipation and distribution than plasmas generated in Gaussian reactors).

Figure 7:
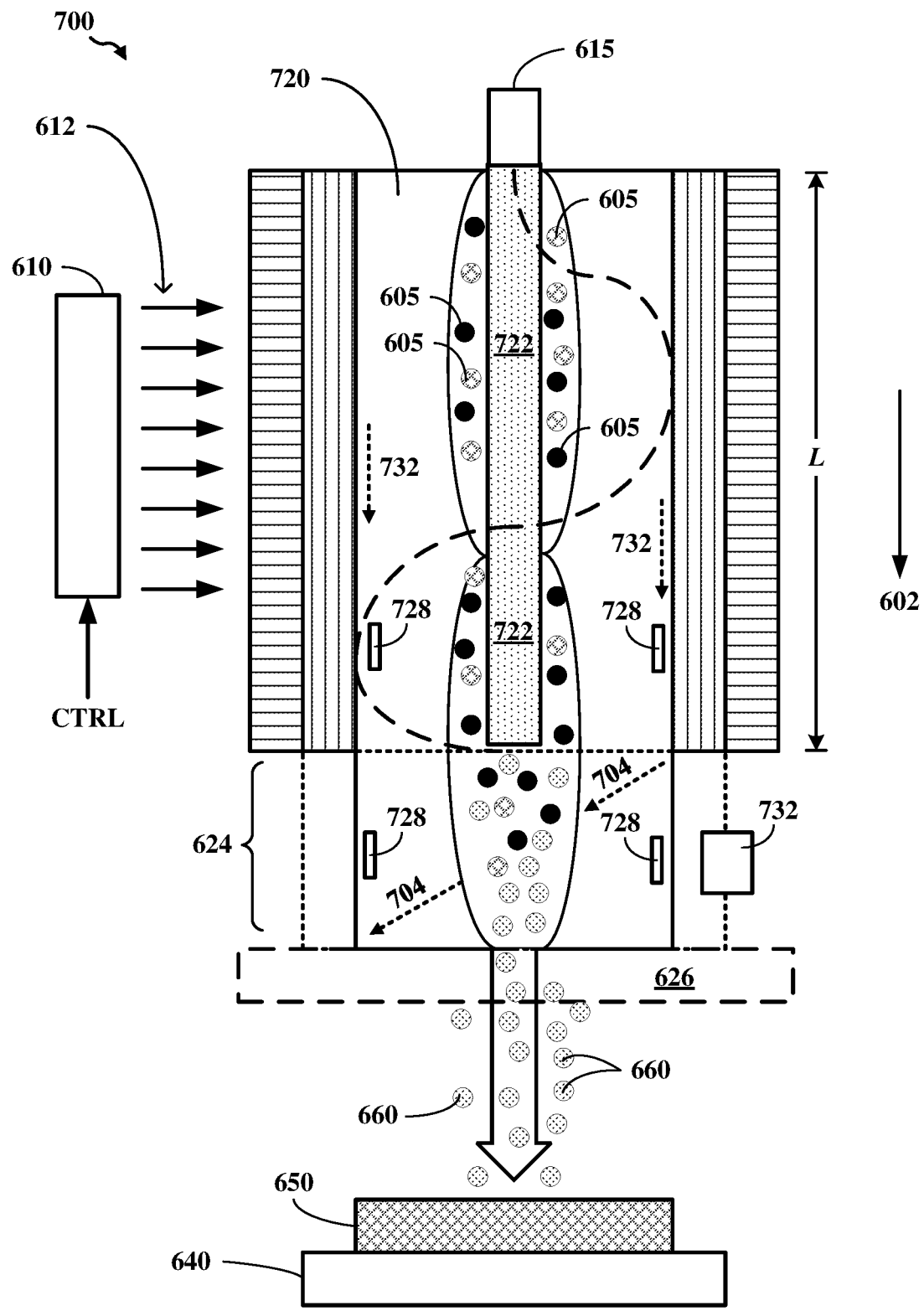
FIG. 7 shows another example reactor that can be used to manufacture, strengthen, and/or reinforce carbon-containing glass materials, according to some other implementations.

FIG. 7 shows another example reactor 700 that can be used to manufacture, strengthen, and/or reinforce carbon-containing glass materials, according to some other implementations. The reactor 700 may be similar in some aspects to the reactor 600 of FIG. 6, and may differ in other aspects from the reactor 600 of FIG. 6. For example, the reactor 700 may include the microwave energy source 610, the input gas inlet 615, a reaction vessel 720, an electric potential source 730, the metal substrate 640, and the collector 626. One aspect in which the reactor 700 differs from the reactor 600 is that rather than having the electric potential source 630 to generate an electric field within one or more portions of the reaction chamber 720, the reactor 700 includes a plurality of electrodes 728 positioned on opposite sides of one or more portions of the reaction chamber 720. The electrodes 728 may be configured to generate an internal electric field (e.g., based on a current and/or voltage provided by an electric supply 732) that can accelerate the plurality of positive charged particles, for example, such that the accelerated positive charged particles have a greater velocity and greater energy when bombarded into the glass material 650. In addition, or in the alternative, the reactor 700 may also include an additional electric potential source (not shown for simplicity) positioned such that a negative electric potential appears across the reaction chamber 722 along a direction 704, and induces current flow 732 along the interior-facing walls of the reaction chamber 722. The current flow 732 induced within the reaction chamber 722 may create a magnetic field that can attract and accelerate at least the positive charged gas particles through the reaction chamber 722 and output from the collector 626 towards the glass material 650.

In addition to methane gas being applied to reactor 600 and reactor 700 to generate carbon-based radicals, a carbon-containing precursor, may include any known carbon particles or structures such as those disclosed in ISO/TS 80004-13:2017(en) entitled "Nanotechnologies—Vocabulary—Part 13: Graphene and related two-dimensional (2D) materials."

In some aspects, the hydrocarbon gas flowed into the reactor 700 may be a short-chain hydrocarbon gas, while in other aspects, the hydrocarbon gas flowed into the reactor 700 may be a long-chain hydrocarbon gas. In some instances, the hydrocarbon gas may include methane ($CH_4$) and/or butane ($C_4H_{10}$). In various implementations, the generation of suitable carbon-based radicals from a non-thermal equilibrium plasma may be based on one or more of the following:

an input carbon-containing gas flow rate of 100 standard cubic centimeters per minute (sccm)—5 standard liters per minute (slm);

lower flow rates typically offer enhanced fidelity and tunability, and may therefore be conducive for accelerating carbon-based species through the reaction chamber 622 and 710, which may result in a lower doping rate of plurality of additives 604 and 704;

higher flow rates typically result in higher output, but may reduce fidelity and/or directionality of the FLG nanoplatelets;

silane and/or a silane-bearing liquid precursor such as hexamethyldisiloxane (HMDSO) or hexamethyldisilazane (HMDSN), as well as pure silane, may be flowed into the reactor 600 and 700 to provide various suitable silicon source rates. In some implementations, the silicon source rate may be one of 1-10 liters/min, 11-20 liters/min, 21-30 liters/min, 31-40 liters/min, 41-50 liters/min, 51-60 liters/min, 61-70 liters/min, 71-80 liters/min, 81-90 liters/min, 91-100 liters/min, 101-200 liters/min, or 201-530 liters/min, where higher flow rates may allow for additional corresponding additive material coating on accelerated ionized particles 616 and 716;

lithium (Li), nickel (Ni), manganese (Mn), copper (Cu), tri-methyl aluminum (TMA), tri-methyl gallium (TMG), and sulfur (S) containing gaseous species may be flowed into the reactors 600 and 700 to provide a silicon source rate of one of 1-10 liters/min, 11-20 liters/min, 21-30 liters/min, 31-40 liters/min, 41-50 liters/min, 51-60 liters/min, 61-70 liters/min, 71-80 liters/min, 81-90 liters/min, 91-100 liters/min, 101-200 liters/min, or 201-530 liters/min, where higher flow rates may allow for a thicker coating of additives on the FLG nanoplatelets 316A and 316B;

additives, including silica, may be flowed into reactor 600 and 700 and/or dispersed in particle form at a ratio of approximately 1%-75% of the flow rate of the methane gas;

additives may be configured to coat and/or decorate accelerated ionized particles 660;

preferred chemistries for the carbon-containing glass materials 650 may include between approximately 0.1%-5% additives and between approximately 65%-99% silica, with the remaining portion attributed to carbon-containing materials (such as the FLG nanoplatelets);

the reactors 600 and 700 may be tuned to achieve an optical transmittance for portions of the carbon-containing glass materials 650 of at least 96% over the visible frequency spectrum and/or to adjust the refractive indexes of the carbon-containing glass materials 650; and provide uniform tinting of the carbon-containing glass materials 650, given that graphene generally demonstrates a neutral light transmission density.

Figure 8A:
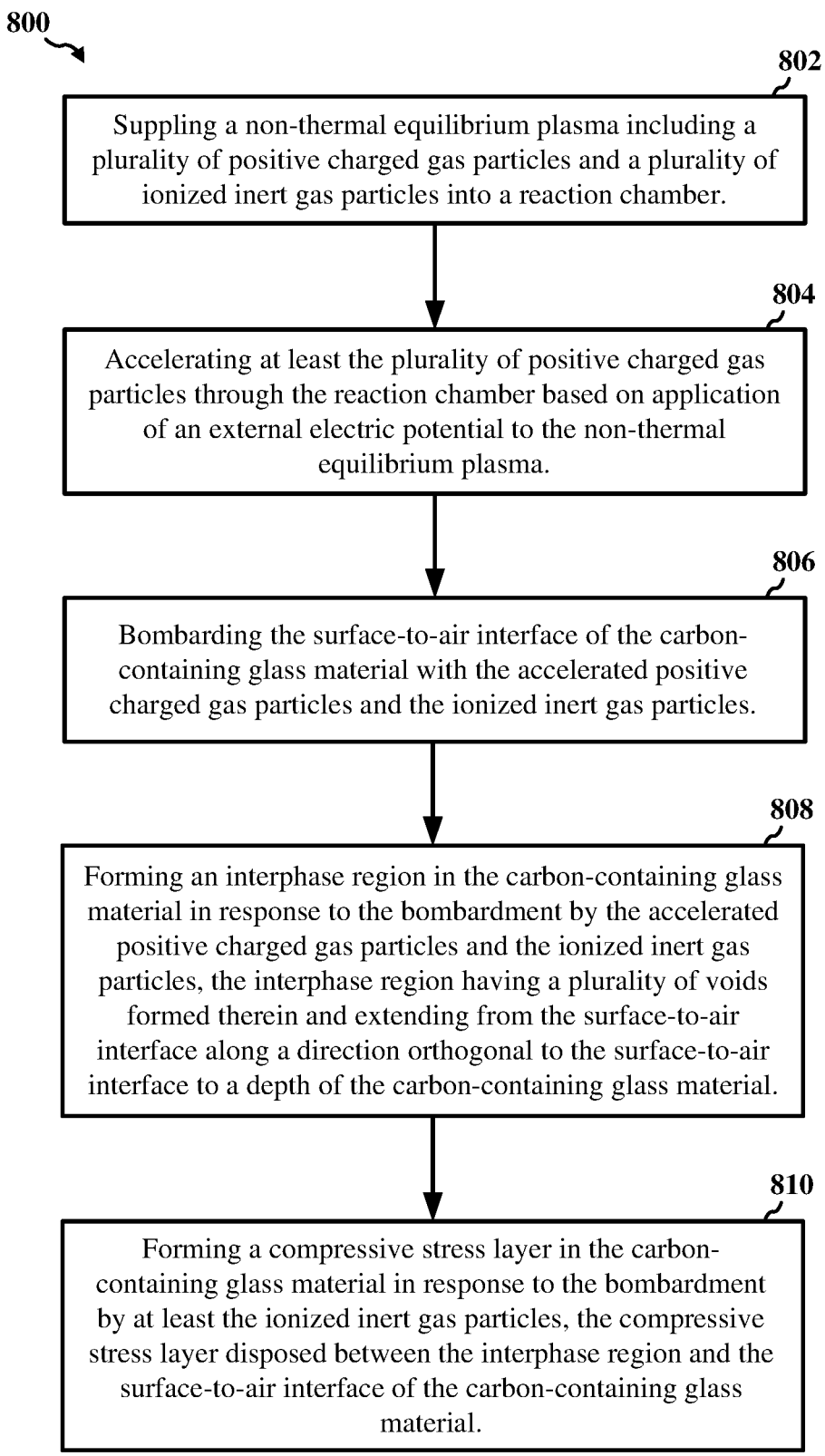
FIG. 8A shows a flowchart illustrating an example operation for reinforcing a carbon-containing glass material, according to some implementations.

FIG. 8A shows a flowchart illustrating an example operation 800 for reinforcing a glass material, according to some implementations. In various implementations, the operation 800 may be performed in a reactor chamber such as (but not limited to) reactor 600 of FIG. 6 or the reactor 700 of FIG. 7. In other implementations, the operation 800 may be performed in another suitable reactor chamber or chemical processing apparatus. In some implementations, the operation 800 may be used to implant particles into a carbon-containing glass material including a surface-to-air interface and an interphase region extending from the surface-to-air interface along a direction orthogonal to the surface-to-air interface to a depth of the carbon-containing glass material, for example, as described with reference to one or more of FIGS. 1-7. In some aspects, the operation 800 begins in block 802 with supplying a non-thermal equilibrium plasma including a plurality of positive charged gas particles and a plurality of ionized inert gas particles into a reaction chamber. The operation 800 continues at block 804 with accelerating at least the plurality of positive charged gas particles through the reaction chamber based on application of an external electric potential to the non-thermal equilibrium plasma. The operation 800 continues at block 806 with bombarding the surface-to-air interface of the carbon-containing glass material with the accelerated positive charged gas particles and the ionized inert gas particles. The operation 800 continues at block 808 with forming an interphase region in the carbon-containing glass material in response to the bombardment by the accelerated positive charged gas particles and the ionized inert gas particles, the interphase region having a plurality of voids formed therein and extending from the surface-to-air interface along a direction orthogonal to the surface-to-air interface to a depth of the carbon-containing glass material. The operation 800 continues at block 810 with forming a compressive stress layer in the carbon-containing glass material in response to the bombardment by at least the ionized inert gas particles, the compressive stress layer disposed between the interphase region and the surface-to-air interface of the carbon-containing glass material.

In various implementations, the carbon-containing glass material may include silicate glass, soda-lime glass, alkali-aluminosilicate glass, borosilicate glass, or any combination thereof. In some implementations, the alkali-aluminosilicate glass consists of between approximately 57% to 60% $SiO_2$, between approximately 10% to 25% $Al_2O_3$, and approximately 10% alkali earth metals.

In some implementations, the external electric potential may be configured to accelerate the positive charged gas particles. In addition, or in the alternative, the non-thermal equilibrium plasma may also include an inherent electric potential. In some aspects, the electric potential inherent to the non-thermal equilibrium plasma may be sufficient to implant at least some of the FLG nanoplatelets into the interphase region without application of an external electric potential to the reaction chamber. In various implementations, the bombardment may form a plurality of microcracks or micro-voids in one or more portions of the carbon-containing glass material.

Figure 8B:
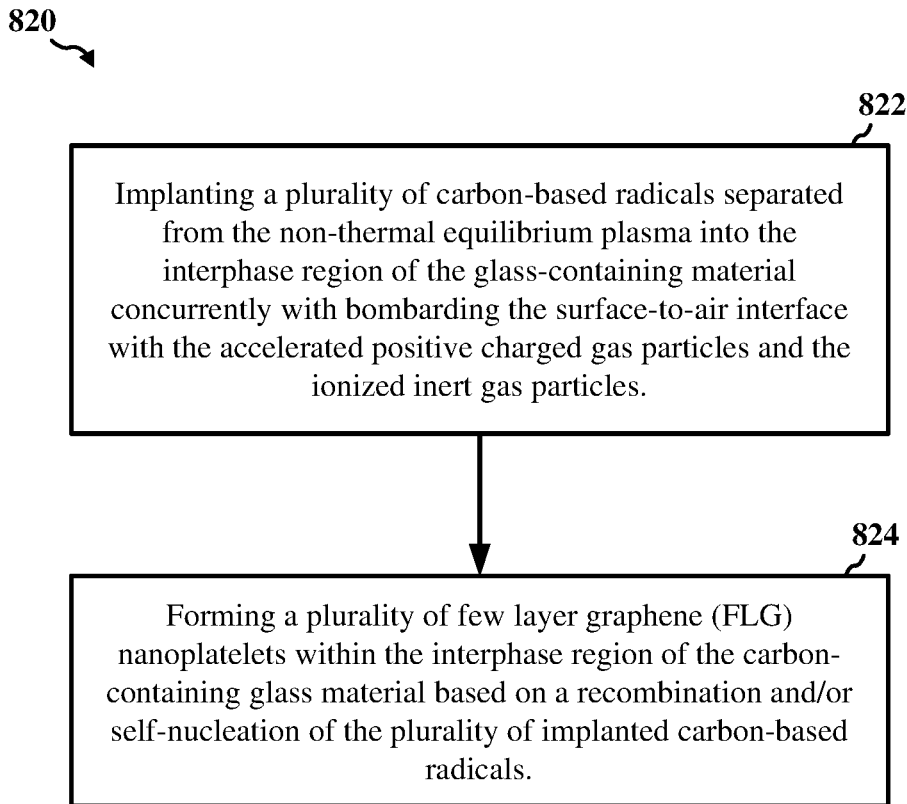
FIG. 8B shows a flowchart illustrating another example operation for reinforcing a carbon-containing glass material, according to some implementations.

FIG. 8B shows a flowchart illustrating an example process 820 for reinforcing a glass material, according to some implementations. In various implementations, the operation 820 may be performed after bombarding the surface-to-air interface with the accelerated positive charged gas particles and the ionized inert gas particles in block 806 of FIG. 8A. In other implementations, the operation 820 may be performed concurrently with forming the compressive stress layer in block 810 of FIG. 8A. For example, the operation 820 begins at block 822 with implanting a plurality of carbon-based radicals separated from the non-thermal equilibrium plasma into the interphase region of the carbon-containing glass material concurrently with bombarding the surface-to-air interface with the accelerated positive charged gas particles and the ionized inert gas particles. The operation 820 continues at block 824 with forming a plurality of few layer graphene (FLG) nanoplatelets within the interphase region of the carbon-containing glass material based on a recombination and/or self-nucleation of the plurality of carbon-based radicals. In some implementations, the carbon-based radicals may be implanted into the interphase region at one or more varying angles of incidence.

In various implementations, an upper portion of the interphase region proximate to the surface-to-air interface has a relatively high concentration of FLG nanoplatelets, and a lower portion of the interphase region distal to the surface-to-air interface has a relatively low concentration of FLG nanoplatelets. In some implementations, the FLG nanoplatelets in the upper portion of the interphase region proximate to the surface-to-air interface have a size of approximately 20 nanometers (nm), and the FLG nanoplatelets in the lower portion of the interphase region distal to the surface-to-air interface have a size of approximately 2 nm. The FLG nanoplatelets in the lower portion of the interphase region may be uniformly distributed across a plane of the lower portion of the interphase region. In one implementation, the FLG nanoplatelets formed in a graded portion of the interphase region positioned between the upper and lower portions of the interphase region gradually decrease in size along the direction towards the depth of the interphase region. In some aspects, each FLG nanoplatelet may include between three and five layers of graphene. In other aspects, the FLG nanoplatelets may have a combined weight of less than 2% of the carbon-containing glass material.

Figure 8C:
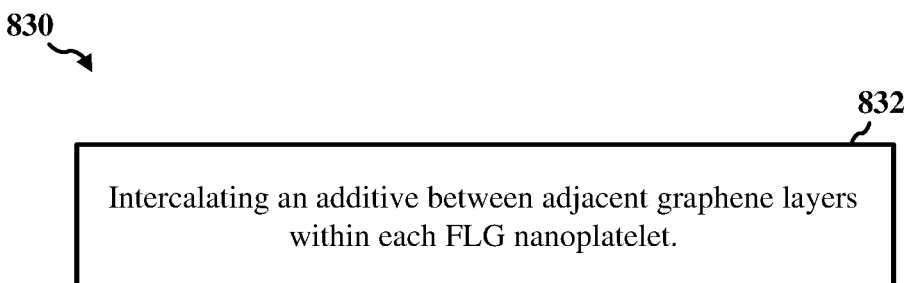
FIG. 8C shows a flowchart illustrating another example operation for reinforcing a carbon-containing glass material, according to some implementations.

FIG. 8C shows a flowchart illustrating an example process 830 for reinforcing a glass material, according to some implementations. In various implementations, the operation 830 may be performed after bombarding the surface-to-air interface with the accelerated positive charged gas particles and the ionized inert gas particles in block 806 of FIG. 8A. In other implementations, the operation 830 may be performed concurrently with forming the compressive stress layer in in block 810 of FIG. 8A. For example, the operation 830 begins at block 832 with intercalating an additive between adjacent graphene layers within each FLG nanoplatelet. In some instances, the additive may include an alkali metal (such as lithium, sodium, potassium, calcium, fluorine, or bromine), a transition metal (such as copper or iron), or any combination thereof. In other instances, the additive may include lithium, nickel, manganese, copper, tri-methyl aluminum (TMA), tri-methyl gallium (TMG), sulfur, or any combination thereof.

In various implementations, first portions of the additive intercalated in the FLG nanoplatelets within in the upper portion of the interphase region have a molar fraction of approximately 50%, and second portions of the additive intercalated in the FLG nanoplatelets within in the lower portion of the interphase region have a molar fraction of approximately 2%. In some implementations, other portions of the additive implanted in an area of the interphase region between the first portion and the second portion have molar fractions that gradually decrease along the direction towards the depth of the interphase region.

In various implementations, the additive is configured to self-heal the carbon-containing glass material based on exposure of the additive to ambient air. For example, the additive can oxidize upon on exposure to ambient air and form an oxidized additive (such as an oxidized metal) based on the exposure to ambient air. The oxidized additive may expand into microcracks and/or micro-voids formed in the carbon-containing glass material. The oxidized additive may also coat the surfaces of microcracks and/or micro-voids formed in the carbon-containing glass material.

Figure 9A:
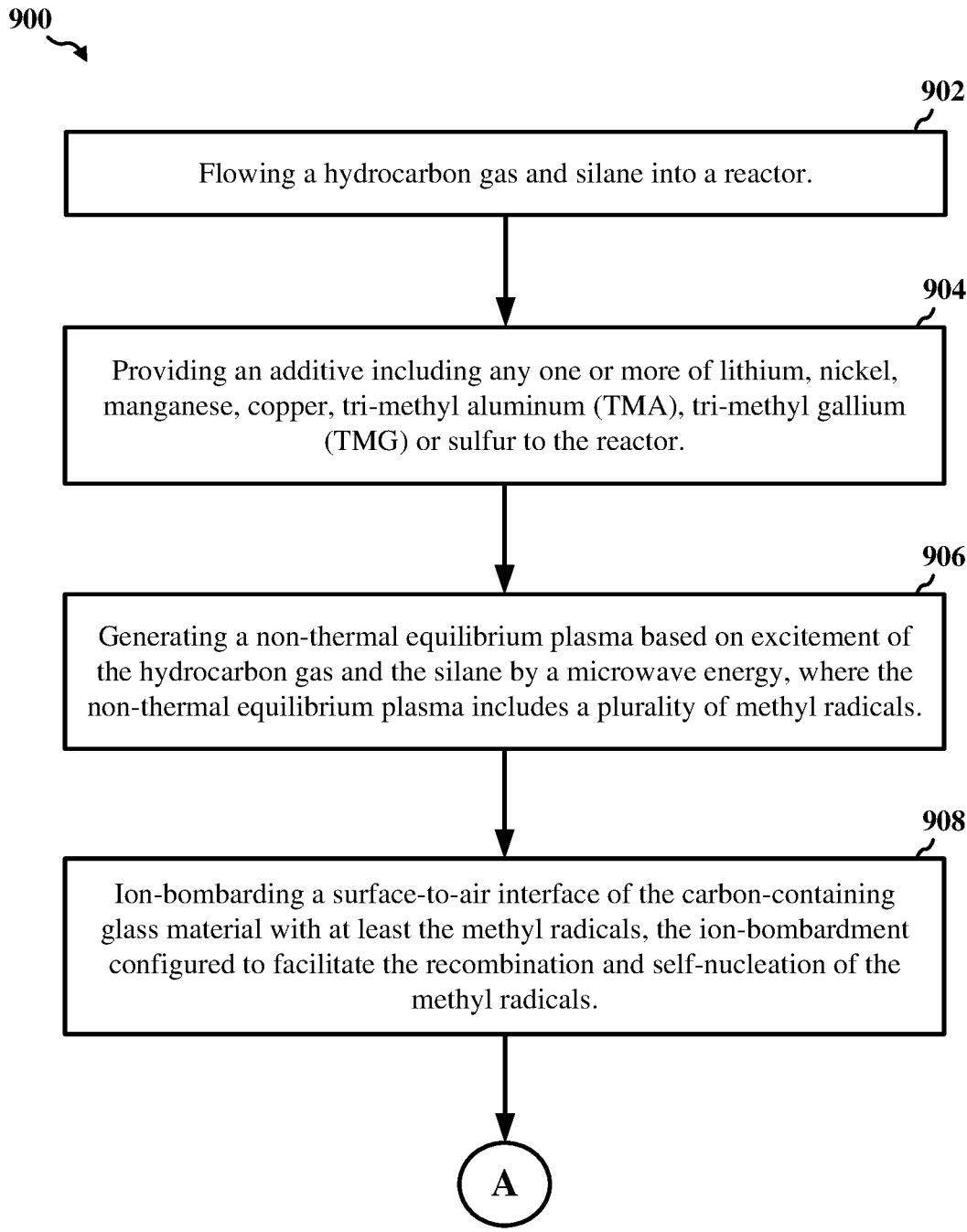
FIGS. 9A and 9B show a flowchart illustrating an example operation for forming a carbon-containing glass material, according to some other implementations.
Figure 9B:
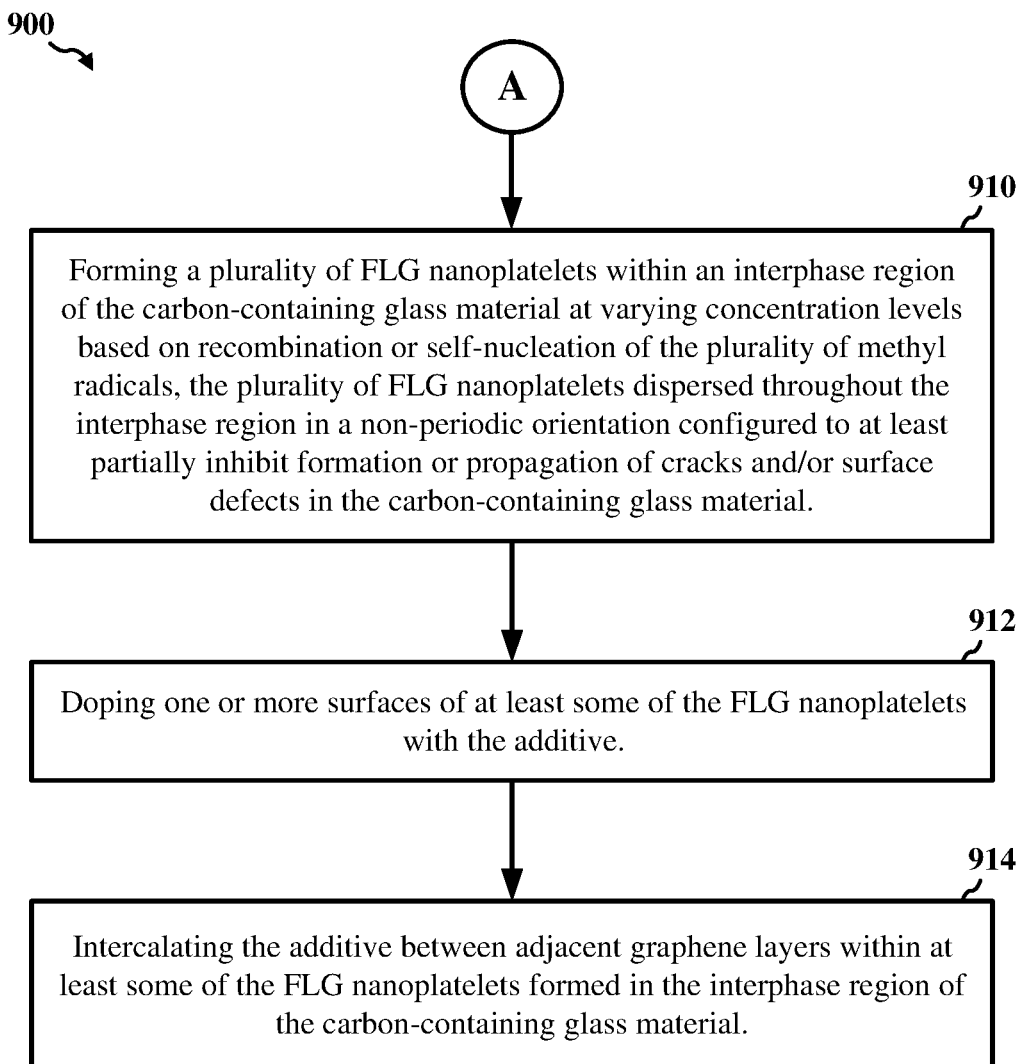

FIGS. 9A and 9B show a flowchart illustrating an example operation 900 for forming a carbon-containing glass material, according to some implementations. In various implementations, the operation 900 may be performed in a reactor chamber such as (but not limited to) the reactor 600 of FIG. 6 or the reactor 700 of FIG. 7. In other implementations, the operation 900 may be performed in another suitable reactor chamber or chemical processing apparatus. In some implementations, the operation 900 may be used to implant particles into a carbon-containing glass material including a surface-to-air interface, for example, as described with reference to one or more of FIGS. 1-7. In various implementations, the operation 900 begins in block 902 with flowing a hydrocarbon gas and silane into a reactor. The operation 900 continues at block 904 with providing an additive including any one or more of lithium, nickel, manganese, copper, tri-methyl aluminum (TMA), tri-methyl gallium (TMG) or sulfur to the reactor. The operation 900 continues at block 906 with generating a non-thermal equilibrium plasma based on excitement of the hydrocarbon gas and the silane by a microwave energy, where the non-thermal equilibrium plasma includes a plurality of methyl radicals. The operation 900 continues at block 908 with ion-bombarding a surface-to-air interface of the carbon-containing glass material with at least the methyl radicals, the ion-bombardment configured to create an interphase region within the carbon-containing glass material. The operation 900 continues at block 910 with forming a plurality of few layer graphene (FLG) nanoplatelets within the interphase region of the carbon-containing glass material at varying concentration levels based on recombination or self-nucleation of the plurality of methyl radicals, the plurality of FLG nanoplatelets dispersed throughout the interphase region in a non-periodic orientation configured to at least partially inhibit formation or propagation of cracks and/or surface defects in the carbon-containing glass material. The operation 900 continues at block 912 with doping one or more surfaces of at least some of the FLG nanoplatelets with the additive. The operation 900 continues at block 914 with intercalating the additive between adjacent graphene layers within at least some of the FLG nanoplatelets formed within the interphase region of the carbon-containing glass material.

In various implementations, the glass material may include any one or more of a silicate glass, soda-lime glass, alkali-aluminosilicate glass, or a borosilicate glass. In some implementations, the alkali-aluminosilicate glass consists of between approximately 57% to 60% $SiO_2$, between approximately 10% to 25% $Al_2O_3$, and approximately 10% alkali earth metals. In some other implementations, the silane may be a silane-bearing liquid precursor or a silane gas. In one implementation, the FLG nanoplatelets formed in the interphase region have a combined weight of less than 2% of the carbon-containing glass material.

In various implementations, the interphase region extends from the surface-to-air interface to a depth of approximately one micron into the carbon-containing glass material. In some implementations, a density of the plurality of FLG nanoplatelets gradually decreases along a direction extending from the surface-to-air interface to the depth of the interphase region.

In various implementations, an upper portion of the interphase region proximate to the surface-to-air interface has a relatively high concentration of FLG nanoplatelets, and a lower portion of the interphase region distal to the surface-to-air interface has a relatively low concentration of FLG nanoplatelets. In some implementations, the FLG nanoplatelets in a graded portion of the interphase region positioned between the upper and lower portions of the interphase region gradually decrease in size along the direction towards the depth of the interphase region. In some aspects, the FLG nanoplatelets in the lower portion of the interphase region are uniformly distributed across a plane of the lower portion of the interphase region.

In some implementations, the additive may be intercalated between the adjacent graphene layers of the FLG nanoplatelets during a post-manufacture isothermal treatment in a vacuum or an inert atmosphere. The additive may be configured to self-heal the carbon-containing glass material based on exposure of the additive to ambient air. For example, the additive may oxidize and form an oxidized additive based on exposure of the additive to ambient air. The oxidized additive may expand into one or more cracks and/or surface defects in the carbon-containing glass material, and may also coat the surfaces of one or more of the cracks and/or surface defects in the carbon-containing glass material.

Figure 10:
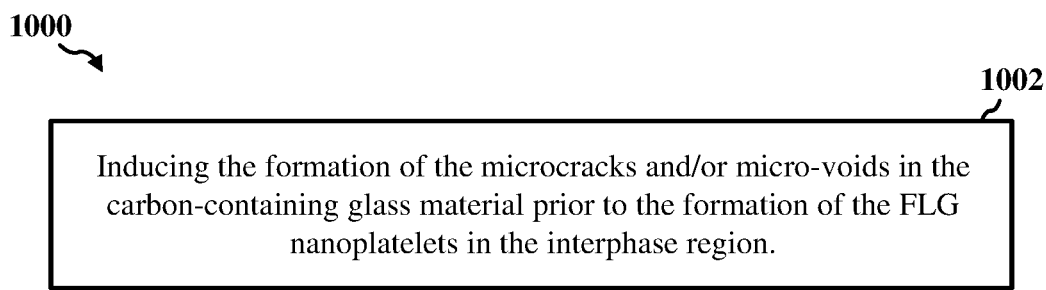
FIG. 10 shows a flowchart illustrating another example operation for forming a carbon-containing glass material, according to some other implementations.

FIG. 10 shows a flowchart illustrating an example operation 1000 for forming a carbon-containing glass material, according to some implementations. In various implementations, the operation 1000 may be performed concurrently with one or more of the processes of the example operation 900 of FIGS. 9A and 9B. For example, the operation 1000 begins at block 1002 with inducing the formation of the microcracks and/or micro-voids in the carbon-containing glass material prior to the formation of the FLG nanoplatelets in the interphase region. In some implementations, microcracks and/or micro-voids may be formed in the glass material by bombarding the surface-to-air interface of the glass material with accelerated charged particles and/or ionized inert gas particles that can penetrate the surface-to-air interface and/or that can impact the surface-to-air interface with sufficient force to create small fissures, microcracks, or voids in the glass material without decreasing the strength or fracture toughness of the glass material.

As used herein, a phrase referring to "at least one of" a list of items refers to any combination of those items, including single members. As an example, "at least one of: a, b, or c" is intended to cover: a, b, c, a-b, a-c, b-c, and a-b-c. The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A carbon-containing glass material comprising:
a surface-to-air interface exposed to ambient air through which carbon-containing radicals penetrate into the carbon-containing glass material; and
an interphase region extending from the surface-to-air interface along a direction to a depth within the carbon-containing glass material, wherein:
the interphase region includes a plurality of few layer graphene (FLG) nanoplatelets formed in response to recombination and/or self-nucleation of the carbon-containing radicals within the interphase region; and
the plurality of FLG nanoplatelets have a non-periodic orientation configured to at least partially inhibit formation or propagation of microcracks and/or micro-voids in the carbon-containing glass material.

2. The carbon-containing glass material of claim 1, wherein a density of the plurality of FLG nanoplatelets gradually decreases along a direction extending from the surface-to-air interface towards a depth of the interphase region.

3. The carbon-containing glass material of claim 1, further comprising a compressive stress layer disposed between the interphase region and the surface-to-air interface of the carbon-containing glass material, the compressive stress layer induced by ion bombardment of the carbon-containing glass material by a plurality of ionized inert gas particles.

4. The carbon-containing glass material of claim 3, wherein the ionized inert gas particles are configured to form a plurality of microcracks or micro-voids between the FLG nanoplatelets formed in the interphase region.

5. The carbon-containing glass material of claim 4, wherein the microcracks or micro-voids have a size between approximately 5 nanometers (nm) and 10 nm.

6. The carbon-containing glass material of claim 4, wherein at least some of the plurality of microcracks or micro-voids are configured to dissipate fracture energy experienced at one or more crack tips in the carbon-containing glass material.

7. The carbon-containing glass material of claim 1, further comprising a monolayer of excess carbon disposed on the interphase region.

8. The carbon-containing glass material of claim 1, further comprising an additive intercalated between adjacent graphene layers within the FLG nanoplatelets formed within the interphase region.

9. The carbon-containing glass material of claim 8, wherein the additive includes any one or more of lithium, sodium, potassium, calcium, or other alkali metal.

10. The carbon-containing glass material of claim 8, wherein the additive includes any one or more of copper, iron, or other transition metal.

11. The carbon-containing glass material of claim 8, wherein the additive is configured to self-heal cracks formed in the carbon-containing glass material upon exposure of the additive to the ambient air.

12. The carbon-containing glass material of claim 8, wherein the additive is configured to form an oxidized additive based on exposure to one or more reactants present in the ambient air.

13. The carbon-containing glass material of claim 12, wherein the oxidized additive is configured to expand into one or more cracks and/or surface defects in the carbon-containing glass material.

14. The carbon-containing glass material of claim 1, wherein a depth of the interphase region is approximately 1 micron.

15. The carbon-containing glass material of claim 1, wherein the plurality of FLG nanoplatelets is configured to induce a compressive residual stress greater than 150 Megapascals (MPa) within the interphase region.

16. The carbon-containing glass material of claim 1, wherein the plurality of FLG nanoplatelets has a combined weight of approximately 2% of the carbon-containing glass material.

17. The carbon-containing glass material of claim 1, wherein the FLG nanoplatelets formed within an upper portion of the interphase region proximate to the surface-to-air interface have a size of approximately 20 nanometers (nm), and the FLG nanoplatelets formed within a lower portion of the interphase region distal to the surface-to-air interface have a size of approximately 2 nm.

18. The carbon-containing glass material of claim 1, wherein each of the FLG nanoplatelets formed in the interphase region comprises between 3 and 5 graphene layers stacked vertically on one another.

19. The carbon-containing glass material of claim 1, wherein the carbon-containing glass material has an optical transmittance of at least 96% across the visible frequency spectrum.

20. The carbon-containing glass material of claim 1, wherein the interphase region of the carbon-containing glass material has a first index of refraction, and other portions of the carbon-containing glass material have a second index of refraction different than the first index of refraction.

* * * * *